United States Patent

Eadon et al.

[11] Patent Number: 5,779,784
[45] Date of Patent: Jul. 14, 1998

[54] PIGMENTARY MATERIAL

[75] Inventors: Desmond G. Eadon, Emmer Green, United Kingdom; Pamela Wood, Milltimber, Scotland

[73] Assignee: Cookson Matthey Ceramics & Materials Limited, London, United Kingdom

[21] Appl. No.: 717,911

[22] Filed: Sep. 23, 1996

Related U.S. Application Data

[63] Continuation of Ser. No. 320,688, Oct. 11, 1994, abandoned.

[30] Foreign Application Priority Data

Oct. 29, 1993 [GB] United Kingdom ............... 9322358
Apr. 30, 1994 [GB] United Kingdom ............... 9408732

[51] Int. Cl.$^6$ ..................................................... C08K 3/00
[52] U.S. Cl. ........................... 106/450; 106/403; 423/604; 423/608; 501/102; 501/103
[58] Field of Search ............................ 106/403, 450; 423/604, 608; 501/103, 102

[56] References Cited

U.S. PATENT DOCUMENTS

| | | | |
|---|---|---|---|
| 3,046,151 | 7/1962 | Iliff | 106/450 |
| 4,443,265 | 4/1984 | Fischer et al. | 106/450 |
| 4,874,433 | 10/1989 | Kiss et al. | 106/450 |
| 5,228,910 | 7/1993 | Joyce et al. | 106/450 |
| 5,252,125 | 10/1993 | Speer et al. | 106/450 |

FOREIGN PATENT DOCUMENTS

| | | |
|---|---|---|
| 974704 | 9/1975 | Canada . |
| 86100442 | 1/1986 | China . |
| 3084066 | 4/1991 | Japan . |
| 3232724 | 10/1991 | Japan . |
| 5186767 | 7/1993 | Japan . |
| 1436060 | 5/1976 | United Kingdom . |
| WO9013605 | 11/1990 | WIPO . |

OTHER PUBLICATIONS

"Coloring of Plastics" edited by Thomas G. Webber, published by Wiley–Interscience Publication, John Wiley & Sons, New York, pp. 1–22 [No date].

DCMA, "Classification and Chemical Description of the Complex Inorganic Color Pigments", Third Edition, 1991, published by Dry Color Manufacturers' Association, index pp. 39&40 and definitions of 39 inorganic pigments (No Month).

*Primary Examiner*—Mark L. Bell
*Assistant Examiner*—Scott L. Hertzog
*Attorney, Agent, or Firm*—Stevens, Davis, Miller & Mosher, L.L.P.

[57] ABSTRACT

A pigmentary material comprises silver in a lattice of crystalline zirconia, which material contains at least 0.4% by weight of the silver. A process for preparing a pigmentary material comprising silver in a lattice of crystalline zirconia comprises calcining a zirconium component which yields the zirconia, and a silver component which yields the silver, forming a calcination mixture of the resultant zirconium and silver moieties and cooling the mixture, the weight of fluoride compound in the total weight of the components to be calcined being less than 6%.

25 Claims, No Drawings

PIGMENTARY MATERIAL

This application is a continuation of application Ser. No. 08/320,688, filed Oct. 11, 1994 (abandoned).

This invention relates to pigmentary material, a process for preparing it, a mixture for use in the process, a pigment comprising the material, a substance coloured by containing the pigment dispersed therein, an enamel composition containing the pigment and an article bearing the fired enamel composition on its surface.

A new pigmentary material has been invented. In a particular embodiment, the material can be used to produce on porcelain, china, earthenware, glass and other surfaces the decorative pink and purple colour space at present afforded by gold-based pigments; the present material is not based on the rare and expensive metal gold.

Accordingly, the invention provides a pigmentary material comprising silver in a lattice of crystalline zirconia, which material contains at least 0.4% by weight of the silver.

The invention provides also a process for preparing this material, which process comprises calcining a zirconium component which yields the zirconia, and a silver component which yields the silver, forming a calcination mixture of the resultant zirconium and silver moieties and cooling the mixture.

The invention provides also a process for preparing a pigmentary material comprising silver in a lattice of crystalline zirconia, which process comprises calcining a zirconium component which yields the zirconia, and a silver component which yields the silver, forming a calcination mixture of the resultant zirconium and silver moieties and cooling the mixture, the weight of fluoride compound in the total weight of the components to be calcined being less than 6%.

The invention provides also a process for preparing a pigmentary material comprising silver in a lattice of crystalline zirconia, which process comprises calcining a mixture of a zirconium component which yields the zirconia, and a silver component which yields the silver, the mixture containing less than 6% by weight of fluoride compound, and cooling the mixture.

The invention provides also a mixture for use in the process, comprising a homogeneous mixture of particles of the zirconium component and particles of the silver component.

The invention also provides a pigment comprising the pigmentary material.

The invention provides also a substance coloured by containing the pigment dispersed therein.

The invention also provides an enamel composition comprising a frit and the pigment.

The invention provides also an article bearing on its surface the enamel composition which has been fired thereon.

U.S. Pat. No. 3,046,151, published in 1962, discloses a method of preparing pink ceramic pigments comprising calcining an intimate mixture of from about 0.2% by weight to about 10% by weight, reported on the basis of silver present, of silver components capable of yielding metallic silver selected from the group consisting of silver powder, silver nitrate, silver carbonate, silver cyanide, and silver resinate; from about 20% by weight to 90% by weight of zirconium compounds capable of yielding zirconium oxide selected from the group consisting of zirconium hydrate, zirconium carbonate, zirconium oxide, zirconium fluoride, and zirconium oxyfluoride; there being present in the mixture a total of from about 7.0% by weight to about 50% by weight of fluoride compounds capable of yielding fluoride ions selected from the group consisting of ammonium bifluoride, zirconium fluoride and zirconium oxyfluoride, at a temperature of from about 600° C. to 1100° C. Fluoride must be used in this method. Contrary to this long standing disclosure, it has now been discovered that silver-zirconia pigmentary material can be produced without having to use fluoride. This is advantageous on health, safety and environmental grounds. When the fluoride-containing mixture of this reference is heated, fluoride is evolved, particularly the hazardous hydrogen fluoride. In addition, we have found that severe attack occurs on refractory containers used in the process, contaminating the pigmentary material and limiting the life of the containers. Furthermore, we have found that inhomogeneously coloured material tends to be produced, with a large quantity of white material in the interior of the fired sample and only a thin, surface, layer which is not white.

The US specification states that it appears that its silver colouring agent is fixed within its zirconium oxide colour fixing agent by the ability of the fluoride ion, under calcination conditions, to open the zirconium oxide crystal lattice. We have found (see Examples hereafter), however, that fluoride is detrimental to the strength and darkness of the colour properties in the present invention. The US specification refers to silver being within its lattice. We have found, however, that much of it is not within the lattice since it is removed by acid washing. The present process enables higher amounts of silver to be obtained in the lattice, higher for instance than in the specific Examples of the US specification. A pigmentary material comprising silver in a lattice of crystalline zirconia, which material contains at least 0.4% by weight of the silver, is a novel composition of matter, and the present invention provides it as such.

The present pigmentary material is extremely good as a pigment. The material can be of a range of colours, wider than the pink of the US specification mentioned above. The colour can be clean and strong. In contrast, the material of this reference is of weak colour; as far as we know, the prior art material has never been commercialised. In addition, the present material can be made using calcination techniques conventional in the preparation of pigments. Furthermore, the present material is very temperature stable, eg at 600°–1300° C., especially at 600°–1000° C., making it very useful in enamels; this contrasts with known colloidal gold pigmentary materials.

The silver in the present material is dispersed in a matrix of crystalline zirconia. The material is not a mere admixture of silver and zirconium oxide. The material is such as is produced by calcining a mixture of a zirconia-yielding component and a silver-yielding component and cooling the hot mixture. The silver is bound with the zirconia in the present material; the silver is in the lattice of the zirconia. The silver is not washed out on washing with 50% by volume nitric acid (ie 1:1 by volume concentrated nitric acid (AnalaR, 69% by weight):deionised water) at 50° C., and hence is in the lattice. Such washing is called herein acid washing.

The US specification claims a pigment in which metallic silver is fixed in a zirconium oxide crystal lattice, and states that the coloration of its material appears to be the result of the fixation of colloidal silver within the zirconium oxide crystal lattice. A proportion of metallic silver was identified in some samples of the present product (containing a higher silver content) by X-ray diffraction, after acid washing. In contrast, however, the present material was found to contain ionic silver as identified by both temperature programmed reduction (TPR) and electron spin resonance (ESR) spectroscopy. TPR of the material confirmed the presence of reducible silver species, on heating 0.4 g of material from −100° to 900° C. in a dynamic atmosphere (30 ml/minute) of 10 volume % hydrogen/nitrogen. In addition, ESR spectroscopy recorded at room temperature (20° C.) identified a proportion of silver present in the zirconia lattice in its +2 oxidation state—an unusual oxidation state of silver. The darker, stronger colours prepared by the present process were found to contain the higher content of $Ag^{2+}$. Preferably, the present material contains a colour-inducing amount of $Ag^{2+}$ in the lattice and contains more such $Ag^{2+}$ than any of the specific Examples of the US specification.

The present material has a lattice of crystalline zirconia (zirconium oxide), which can be shown by X-ray diffraction analysis. The lattice contains silver. The material contains at least 0.4% of the silver. Percentages in this specification are by weight unless otherwise indicated. In a particular embodiment, the material contains up to 10, for instance up to 5, for example up to 3, parts by weight of the silver per 100 parts by weight of the zirconia. The material preferably contains at least 0.6, particularly at least 1, % of the silver. The material preferably contains up to 10, especially up to 6, particularly up to 5, for instance up to 4, % of the silver. Thus, in a preferred embodiment, the material contains 0.4–10%, preferably 1–6%, especially 1–4%, of the silver. Additional silver can be present with the material, the additional silver not being in the lattice of crystalline zirconia and hence not being part of the essential structure. In fact, freshly made product usually does contain such additional silver left over from the process of preparation.

The process of preparation described in the US specification mentioned above demands the use of fluoride, and traces of fluoride consequently tend to be found in the product, both in its bulk (as measured by chemical analysis) and in its surface (as measured by X-ray photoelectron spectroscopy). In contrast, the present process preferably avoids deliberately added fluoride, and the present material preferably contains less than that amount of fluoride which is the minimum present in any of the specific Examples of the reference.

The present pigmentary material preferably contains less than 0.5%, especially less than 0.3%, particularly less than 0.2%, for instance less than 0.1%, eg less than 0.01%, by weight fluoride.

In a particular embodiment, the present material contains in its surface less than 0.1 atomic % of fluoride as measured by X-ray photoelectron spectroscopy (XPS). We have found that even stronger, cleaner, colours tend to be found after acid washing. In this particular embodiment, the present material contains in its surface less than 0.1 atomic % of fluoride as measured by XPS after washing with 1:1 by volume concentrated nitric acid (AnalaR, 69% by weight) :deionised water at 40°–50° C. The washing must be done of course under such conditions, eg of stirring, that a product of steady composition is obtained. We have found that the temperature range of 40°–50° C. is suitable.

In the present material, the crystalline zirconia is advantageously in the monoclinic form; preferably at least half, particularly at least 75%, of the crystalline zirconia is in this form. It will be appreciated that the lattice of crystalline zirconia can be oxygen deficient.

The present material containing silver in a lattice of crystalline zirconia is a remarkable new pigmentary material. Providing this structure is present, the lattice can contain additional substance. It will be appreciated that the additional substance may induce a phase transition from one crystalline form of zirconia to another. For convenience, the lattice is described herein as containing additional substance, ie as though on taking away the zirconia lattice and silver (Ag and any counter-ion thereof) what remains is additional substance. It will be appreciated, however, that the additional substance is not present as a separate entity: the pigmentary material has a single phase, though it may be in admixture with another phase. The substance may have no significant effect on the colour, but it has been found that surprisingly small amounts can affect significantly the colour of the material or the colour of fired enamel resulting from the material. The substance can be present from contaminants in the components used to prepare the material or from components deliberately admixed, for example as diluents or to affect the colour. The substance usually makes up at least 0.01%, for instance at least 0.1%, for example at least 0.5%, eg at least 1.0%, by weight of the material. The substance usually makes up at most 90%, preferably at most 50%, especially at most 30%, for instance at most 10%, by weight of the material, particularly when it affects the colour. The substance can comprise for instance at least one material selected from Al, Si, Y, Hf, Ce, In, Sr, Ca, Mg, Sn, Pr, Fe, Co, V, Mn, Cu, Ni, Zn, Na, Sb, Bi, B, Cd and Pb and compounds (for instance an oxide) of any of these. Of particular interest is the substance comprising at least one material selected from Mg, Ce, Sn, Sr, Y and Hf (particularly Mg, Ce and Sn) and compounds (for instance an oxide) of any of these. The presence of a magnesium species (for instance magnesia) tends to produce a pigmentary material whose fired enamel composition on glazed ceramics is a light pinkish-fawn colour, which however is not as clean as the corresponding light pinkish-fawn colour resulting from a sodium species (for instance sodium oxide) as contaminant in Example 10 hereafter. The corresponding presence of a cerium species (for instance ceria) rather than a magnesium species (for instance magnesia) tends to produce a pink/red colour, as does the presence of a tin species (for instance tin oxide); the former tends to be cleaner and purer than the latter.

The present pigmentary material can be prepared by calcining a zirconium component which yields the zirconia, and a silver component which yields the silver, forming a calcination mixture (ie a mixture at calcination temperature) of the resultant zirconium and silver moieties and cooling the calcination mixture. One of the components can be calcined and while hot have the other component admixed with it. Preferably, however, a mixture of the zirconium component and the silver component is calcined to form the calcination mixture. The present calcination mixture is usually at a temperature of 500°–1300° C., preferably 650°–1100° C., and especially 800°–900° C. The calcination temperature may be held for ½–3 hours, for instance ½–1½ hours. For larger scale production, it is preferred, however, that the calcination temperature be held for 3–7, particularly 4–6, hours. It has been found that holding the calcination temperature for longer periods tends to decrease the amount of silver in the zirconia lattice, and hence this is undesired. Similarly, it has been found that the higher calcination temperatures tend to lead to a lower silver content. It is desirable that as much of the silver in the silver component ends up in the lattice as possible, other things being equal, so as to avoid waste of silver component. The present process makes better use of the valuable silver starting material in this way than does the process of the US specification mentioned above. In the present process, preferably at least 15% of the percent Ag in the combined weight of the zirconium component, calculated as zirconia, and the silver component, calculated as silver, is retained as the Ag in the pigmentary material.

The rate of temperature rise in the calcination does not seem to have a large effect on the colour resulting from the use of the pigmentary material in an enamel fired on top of a glazed ceramic on the laboratory scale, though it does on large scale production. The rate of temperature rise can be for instance 100°–900° C. per hour, preferably 100°–500° C. per hour. For larger scale production, the rate is especially 200°–400° C. per hour. Stepping the increase in temperature by holding an intermediate temperature steady for a time before again increasing the temperature seems to tend to result in a weaker colour in the pigmentary material.

The rate of cooling appears to be more significant than the rate of heating. Powders that have been cooled rapidly (eg taken out of the furnace and allowed to cool at 20° C., or taken out of the furnace and water quenched, rather than allowed to cool in the furnace) give a stronger (ie better, darker) colour in the pigmentary material and in an enamel fired on top of glazed ceramic.

The atmosphere in which the calcination is done can be static or flowing. The atmosphere is conveniently air. A non-air atmosphere, however, can be employed, for instance a nitrogen atmosphere, an oxygen atmosphere or a 10% hydrogen/90% nitrogen by volume atmosphere. Calcination can also be carried out in a gas fuelled furnace. These different calcination atmosphere conditions can affect the colour of the pigmentary material.

The present calcination can be conducted in ways conventional in the production of pigments.

The particular combination of components and conditions of the present process are so chosen as to produce the present pigmentary material. The zirconium component is preferably such that it decomposes to zirconia on heating to the temperature of the calcination mixture (and hence is not zirconia itself). Preferably, the zirconium component is such that on cooling from the calcination temperature, crystalline monoclinic zirconia is formed, especially rapidly from the tetragonal form. Advantageously, the zirconium component is such that on heating it to 860° C., it contains, as measured by XRD (X-ray diffraction) at 860° C., less than 45% (and preferably less than 20%) crystalline monoclinic zirconia and that on then cooling it from the 860° C. to 30° C., it contains, as measured by XRD at 30° C., at least 55% (and preferably at least 80%, especially at least 90%) crystalline monoclinic zirconia. The remaining crystalline zirconia, measured by XRD at 860° C. and on cooling to 30° C., consists of crystalline tetragonal zirconia. Quantitative analysis of the crystalline monoclinic zirconia content was determined using the method of Hideo Toraya, Masahiro Yoshimura and Shigeyuki Somiya, provided in the Journal of the American Ceramic Society, volume 67, pages C-119 to C-121 (1984). Of particular interest is zirconium carbonate and/or zirconyl hydroxide, both of which decompose to zirconia on heating. Zirconyl hydroxide is preferred for pink to purple shades.

The chemistry of zirconyl hydroxide is poorly understood in the scientific community. It appears that the species produced depends on the method of production and subsequent treatment. There is much debate in the scientific literature as to the nature of the species that exist in solution and on subsequent precipitation. The amorphous nature of the precipitated material makes definitive characterisation virtually impossible and the fact that the material changes with time, or on drying, adds to the difficulty. Accordingly, there are several names for the material used in the literature including:

hydrous zirconia (water is bound loosely in non-stoichiometric quantities);

zirconia hydrate—$ZrO_2.nH_2O$;

zirconium hydroxide—$Zr(OH)_4$, $Zr(OH)_4(H_2O)_n$ formulated as $Zr_4(OH_8{}^b(OH)_8{}^t(H_2O)_x$ where b indicates a bridging hydroxyl group and t a terminal hydroxyl group; and zirconyl hydroxide—$ZrO(OH)_2$, $ZrO(OH)_2(H_2O)_m$ formulated as $Zr_4O_4(OH)_8{}^t(H_2O)_y$.

The term zirconyl hydroxide is used in the present specification, as it is mentioned that zirconyl hydroxide is produced when freshly precipitated material is aged or dried at 100° C. The term is used to embrace all such species and names. Similar terminology difficulties exist for zirconium carbonate, since it hydrates very readily. Its preparation generally results in a hydrous form, and its composition is difficult to characterise and control unless it is prepared and stored under strict conditions. It is referred to in the literature as zirconium carbonate, zirconium basic carbonate, hydrous carbonated zirconia and zirconyl carbonate. The term zirconium carbonate is used in the present specification to embrace all such names. In the Examples in this specification, we have defined the compounds used by determining the zirconia content of the amorphous zirconium starting material after calcination at 900° C.

The zirconyl hydroxide can be bought in or prepared. It can be prepared by hydrolysing a zirconium compound, such as zirconyl nitrate or sulphate, with aqueous base. Alternatively, the zirconyl hydroxide can be prepared by hydrolysing a zirconium compound, such as zirconium butoxide or propoxide, with water. In a particularly interesting technique, the zirconyl hydroxide can be prepared by hydrolysing a zirconium compound, such as zirconium butoxide or propoxide, with an aqueous solution of the silver component, such as silver nitrate; in this technique, the butoxide appears to give a stronger colour than the same weight of the propoxide. Using silver nitrate in an amount of 4 parts by weight calculated as silver per 100 parts by weight of the zirconium compound calculated as zirconia, the butoxide and propoxide have given pale lilac/grey colours; and at 7 parts per 100, a more intense lilac; and at 20 parts per 100, the butoxide has given a strong purple colour. The zirconyl hydroxide can be prepared by sol-gel or aerogel techniques.

Advantageously, the zirconium component is amorphous. It has been found that stronger colours then tend to result. The zirconium component employed is preferably substantially wholly amorphous, though mixtures of amorphous and crystalline component, preferably containing more than 50% by weight amorphous component, can be employed.

Thus, preferably crystalline zirconia is avoided as the zirconium component This tends to result in poorer colours and to need the use of mineralisers.

Preferably, the zirconium component is of particle size 1–25, especially 1–15, for instance 1–4, for example 1–2, µm. Particle sizes specified herein are as measured by Coulter Counter unless otherwise indicated, though similar results are obtained by scanning electron microscopy. It has been found that cleaner, slightly stronger, darker, colours (as viewed by eye) tend to result from the use of zirconium component of this particle size, at least when the silver component is silver nitrate, silver(I) oxide or silver carbonate. Accordingly, it is preferred that the zirconium component be milled down to this size before the calcination. It has been found also that milling the zirconium component before calcination increases the loading of the silver that is taken up into the zirconia lattice.

Metallic silver can be employed as the silver component. More preferred is the silver component being such that it at least has begun to decompose to metallic silver on heating to a temperature below 600° C., especially below 550° C., in particular below 300° C., for instance below 250° C., as this tends to give a stronger colour. For instance, silver acetate decomposes at 220° C. and tends to give a strong purple colour (unless modified by additional substance) while silver chloride decomposes at 850° C. and tends to give a weak pink colour (unless modified by additional substance).

It is particularly preferred that the silver component is metallic silver or is such that it at least has begun to decompose to metallic silver at a temperature not more than 200° C. above the temperature which is (a) 370° C. or (b) if higher, the temperature at which decomposition of the zirconium component to zirconia begins to occur. In another particularly preferred embodiment, the silver component is metallic silver or is such that it at least has begun to decompose to metallic silver at a temperature not more than 200° C. above the temperature at which the zirconium component begins to form crystalline zirconia. Zirconyl hydroxide and zirconium carbonate typically begin to form crystalline zirconia at about 370° C. The silver seems to get locked into the lattice better when it is present as zirconium and oxygen atoms are arranging themselves into their crystal structure.

The silver component can be, for instance, silver nitrate, silver(I) oxide, silver(II) oxide, silver acetate, silver lactate, silver laurate, silver stearate, silver itself or silver nitrite. The silver component is preferably silver, silver nitrate, silver acetate, silver(I) oxide or silver carbonate.

The silver component is preferably of particle size 1–15 μm. In a more preferred embodiment, however, the silver component is of particle size 0.1–15, particularly 0.1–5, especially 0.5–2, μm. Milling tends to result in a cleaner, stronger, colour. As the milling time increases, the amount of silver in the lattice of the pigmentary material tends to increase. The silver component, for instance silver oxide, and the zirconium component can be milled together. When one or both of the present essential components is milled, this can be done in known way, for instance using a mortar and pestle, ball mill or vibro mill.

When the silver component is water-soluble (silver nitrate for instance), it can be introduced as a solution in water.

When an additional substance as discussed above is to be present in the present material, it can be introduced by means of a component yielding the substance in the calcination mixture.

Mineraliser can be employed in the present process (for instance if crystalline zirconia is employed as the zirconium component), though fluorides used in accordance with the disclosure of the US specification mentioned above are to be avoided. That specification states also that a non-volatile organic reducing agent, for instance selected from urea, carbohydrates, cream of tartar and oxalic acid, is preferably employed in its process, in order to obtain a stronger colour. Such a reducing agent is not needed in order to obtain a strong colour in the present process, and preferably it is avoided.

The present process is preferably conducted by calcining a mixture comprising the zirconium component and the silver component. The mixture preferably comprises a homogeneous mixture of particles of the zirconium component and particles of the silver component. The mixture usually contains 1–50, preferably 2–10, especially 6–9, parts by weight of the silver component measured as silver per 100 parts by weight of the zirconium component measured as zirconia. The mixture is usually a batch mixture, and this is usually calcined batch-wise. Continuous production techniques can, however, also be employed.

Preferred is a process for preparing a pigmentary material comprising silver in a lattice of crystalline zirconia, which process comprises calcining a zirconium component which yields the zirconia, and a silver component which yields the silver, forming a calcination mixture of the zirconium and silver moieties and cooling the mixture, the weight of fluoride compound in the total weight of the components to be calcined being less than 6%, especially less than 4%, particularly less than 2%. In a preferred embodiment, there is no deliberately added fluoride. This contrasts with the 7–50% required in the process of the US specification mentioned above.

Preferred also is a process for preparing a pigmentary material comprising silver in a lattice of crystalline zirconia, which process comprises calcining a mixture of a zirconium component which yields the zirconia, and a silver component which yields the silver, the mixture containing less than 6%, especially less than 4%, particularly less than 2%, by weight of fluoride compound. This mixture is the preferred mixture for use in the present process. In a preferred embodiment, the mixture contains no deliberately added fluoride.

The zirconium and silver moieties should be brought into intimate admixture with one another so as to form the silver in the lattice of crystalline zirconia. The mixture is accordingly preferably an intimate mixture. The calcination mixture should be homogeneous in order to produce homogeneous desired product. The mixture which is calcined is accordingly preferably homogeneous. The mixture can be calcined in known way, for example in a tunnel kiln, intermittent kiln or rotary tube furnace. Preferably the mixture which is calcined is in a layer at least 5 mm deep, eg 1–100 cm, though usually 10–30 cm, deep; good colour throughout the product is obtained in contrast to what we have found with the process described in U.S. Pat. No. 3,046,151, as is mentioned above.

When preparing the pigmentary material in the present way, it has been found that not all the silver emanating from the silver component finishes up in the zirconia lattice. Some of the silver is left free. The free silver can remain, but if it is not desired for the use to which the pigmentary material is to be put, the free silver can readily be removed, for instance by 50% by volume nitric acid at 50° C. Free silver with the pigmentary material used in an enamel composition on glass tends to cause a brown/yellow discolouration of the glass; for this use, therefore, the free silver is desirably removed. For use in an enamel composition on glazed ceramics, the effect of the free silver is not as pronounced, but it tends to make the colour slightly dirtier.

The amount of silver in the lattice tends to increase, at least up to a certain level, as the proportion of silver component measured as silver to zirconium component measured as zirconia increases in the starting components.

The particular zirconium component and silver component can affect the colour of the pigmentary material when fired in an enamel composition on glazed ceramics. Thus, among silver components, silver nitrate tends to give a particularly strong colour, but with a high blue component, while silver(I) oxide gives a redder colour, and silver carbonate also gives a redder colour but is less blue.

The present pigmentary material is outstandingly good as a pigment. The material is coloured in the sense that when it is seen by a normal unaided human eye receiving light reflected from it, the material is perceived as exhibiting a dominant colour which is describable in terms of at least one of four so-called "basic colours". These colours (namely red, yellow, green and blue) are used to describe colour as a physiological sensation rather than a physical property analyzable by spectroscopy. The use of the four basic colours together with two other parameters (which are "lightness" and "chroma") to describe colour as perceived by the eye is explained in Chapter 1 of the book "Colouring of Plastics" edited by T. G. Webber and published by Wiley-Interscience of New York in 1979. In particular, the book outlines the CIELab colour coordinates system for describing colour and also explains how a colour can be intermediate in the sense that it is describable in terms of two or more basic colours. For example, orange as perceived by the eye is describable as a combination of red and yellow even though to a spectroscopist a pure orange light might contain only one wavelength of light. The book explains how colours can be expressed as an angle of 0° to 360° and that this angle is called the "hue" of the colour. For example, reds have hue angles of about 0°, yellows of about 90°, greens of about 180° and blues of about 270°. Intermediate angles represent shades describable in terms of more than one basic colour (for example 60° represents an orange which is describable in terms of red and yellow).

The present material has a wide range of colours, depending for instance on any additional substance as discussed above incorporated into it. The present material is also of good chroma. In terms of the CIELab colour coordinates system, its chroma is usually 5 to 32, for instance 21 to 26, for example 22 to 25. The material is highly opaque.

The present material makes better use—in terms of a darker colour (lower CIElab lightness value)—of the Ag retained in the lattice than does the material of the US specification mentioned above. Accordingly, in a preferred embodiment the present material has a $$\frac{|L|}{|Ag|}$$

value of less than 130, especially less than 100, particularly less than 75, where |L| is its CIElab lightness (L) value and |Ag| is the percent by weight Ag in the pigmentary material. Likewise, in another preferred embodiment the present material has a $$\frac{|L|}{|Ag|}$$

value of less than 200 and a CIElab hue angle (H)—measured after on-glaze application to china as described hereafter in Example 78 using a 120T screen—of 35°–90°, especially 35°–60°; it should be noted that in this definition the $$\frac{|L|}{|Ag|}$$

value is as measured on the material before formulation for any application to china while the hue angle is as measured after such application (because the hue angle can change on such application).

The present material is useful in a wide range of pigmentary applications. It can be formulated and used as a pigmentary material in conventional ways.

When used as the whole or a part of a pigment, the material usually has a particle size distribution of 0.5 to 30 microns. The particle size can be reduced by grinding.

The pigment comprises (ie consists of or includes) the present material. The material can be employed as sole pigmentary material or admixed with other pigmentary material, eg to change the colour or shade. The present material produces good pigments when admixed with an unusually wide range of other pigmentary materials. When used in admixture with other pigmentary material, the proportions of the two can range from 0.1 to 99.9 parts by weight of other pigmentary material per 0.1 to 99.9 parts by weight of present material.

The other pigmentary material can be known per se. It can be inorganic or organic, for instance one or more of the following: black $CuCr_2O_4$ (DCMA 13-38-9), $(Fe,Co)Fe_2O_4$ (DCMA 13-39-9), $(Co,Fe)(Fe,Cr)_2O_4$ (DCMA 13-40-9), $(Fe,Mn)(Fe,Mn)_2O_4$ (DCMA 13-41-9) and $(Fe,Mn)(Fe,Cr,Mn)O_4$ (DCMA 13-48-7); yellow/orange $(Zr,V)O_2$ (DCMA 1-01-4), $(Ni,Sb,Ti)O_2$ (DCMA 11-15-4), $BiVO_4$ (BASF L 1110), $Pb_2Sb_2O_7$ (DCMA 10-14-4), $(Sn,V)O_2$ (DCMA 11-22-4), $(Zr,Pr)SiO_4$ (DCMA 14-43-4) and $(Ti,Cr,Sb)O_2$ (DCMA 11-17-6); green $CoCr_2O_4$ (DCMA 13-30-3), $3CaO:CrO_3 3SiO_2$ (DCMA 4-07-3), $Co_2TiO_4$ (DCMA 13-31-3) and $Cr_2O_3$ (DCMA 3-05-3); blue $(Zr,V)SiO_2$ (DCMA 14-42-2), $Co_2SiO_4$ (DCMA 5-08-2), $(Co,Zn)Al_2O_4$ (DCMA 13-28-2) and $CoAl_2O_4$ (DCMA 13-26-2); pink $(Al,Mn)_2O_3$ (DCMA 3-04-5), $(Al,Cr)_2O_3$ (DCMA 3-03-5) and $(Sn, Cr)O_2$ (DCMA 11-23-5); red/orange CdSe and related derivitives $CdSe_{1-x}S_x$; brown $Fe(Fe,Cr)_2O_4$ (DCMA 13-33-7), $(Ti,Mn,Cr,Sb)O_2$ (DCMA 11-46-7), $(Zn,Fe)(Fe,Cr)_2O_4$ (DCMA 13-37-7), $NiFe_2O_4$ (DCMA 13-35-7) and $(Zr,Fe)SiO_4$ (DCMA 14-44-5); grey $(Sn,Sb)O_2$ (DCMA 11-24-8) and $(Ti,V,Sb)O_2$ (DCMA 11-21-8); white $TiO_2$; and colloidal gold and/or colloidal silver containing colours. The other pigmentary material can be for instance a colloidal gold containing colour together with a blue, green or yellow colour. The DCMA number is that given in DCMA, Third Edition, 1991, published by the Dry Color Manufacturers' Association, USA.

The pigment can be used to colour a wide range of substances. The substance can contain for instance 0.01 to 90% by weight of the pigment. The substance can be for instance an enamel or glaze. The pigment can be used as a dispersion in an organic or aqueous system to make for instance a paint or ink. The pigment can be used as a colorant in colour printers.

Of particular interest is an enamel composition comprising a frit and the pigment, usually in the proportions of 1–99 parts by weight of the frit and 1–99 parts by weight of the pigment, preferably 60–95 parts by weight of the frit and 5–40 parts by weight of the pigment. The frit can be conventional; it can be leaded or unleaded. The enamel composition can be made and used in conventional ways. It can be made by admixing the ingredients, preferably by milling. It is usually applied as a dispersion in a carrier material; the enamel composition then usually contains 60–80% in total of the frit and pigment. The carrier material can be an aqueous or organic medium; it can be thermoplastic; it can be infra-red drying or ultra-violet curing; all such types of media are known and can be employed in known ways.

The enamel composition can be applied to an article in the usual way. For instance, the composition can be applied by printing (for example screen printing) or spraying. It can be applied as a paste. It can be applied directly to the article to bear the enamel. Alternatively, it can be used to form a transfer which in turn is applied to the article to bear the enamel. Accordingly, the invention includes a transfer comprising the enamel composition on a transfer backing sheet; usually the transfer includes a cover coat.

The enamel composition is usually applied to decorate the article. After application, the composition can be fired in the usual way, generally at 500°–1300° C. Usually, for a standard firing cycle after application to ceramic ware bearing a fired glaze, the firing temperature is within the range 700°–850° C. and the firing time is 5–7 hours, with the peak temperature being held for ½–1½ hours. Usually, for a fast firing cycle after application to ceramic ware bearing a fired glaze, the firing temperature is within the range 700°–1000° C. and the firing time is ½–4 hours, with the peak temperature being held for 5–20 minutes. The enamel composition can alternatively be used under or in glaze on ceramic ware.

The enamel composition is preferably applied to glass or ceramic ware, though it can be applied to metal ware. The ceramic ware can be china, earthenware or porcelain. The ceramic ware bearing the fired composition preferably bears also a fired glaze. The composition is preferably applied to ceramic ware bearing a fired glaze. The present ceramic ware can be for instance a tile, sanitary ware or table-ware such as a plate. The glass can be for instance container glass or toughened glass. The metal ware is especially a jewellery substrate.

Typical decorating processes by which the present pigment may be applied include the following: hand-painting or hand-banding; direct screen; offset litho transfer; curtain or waterfall printing; spray applications; screen transfer—waterslide; screen transfer—heat release; total transfer; silicone pad printing; machine lining; dusting/crinkle/jewellery; heat release decal; banding brush—machine or hand; banding steel wheel or neoprene wheel machines; inkjet printing; wet litho printing, or stamping.

The invention is illustrated by the following Examples. Water used in the preparation of the pigmentary material was deionised water because the presence of chlorine was found generally to impair the colour somewhat.

The CIELab coordinates were measured using an ICS-Texicon QMM-2000 instrument with a small rectangular aperture of dimension 10 mm×5 mm. The instrument was set in reflectance mode with D65 illuminant and a 10° observer angle. The specular component was included, as was the UV component, and measurements were made every 20 nm. The CIELab equations were used to calculate the values of lightness (L), chroma (C) and hue angle (H). Before making any measurements, the instrument was calibrated using clean black and white ceramic standard calibration tiles. A brass holder was used to contain the powder for colour measurement. This holder consisted of a disc of brass 40 mm in diameter and 10 mm thick, with a circular well of diameter 15 mm and depth 1 mm milled into the centre of one of the flat faces. The pigment powder was packed into the well, taking care to completely fill the well. For these measurements, the powder must be firmly packed into the well and the top surface must be level with the surface of the brass disc. The brass surface should be cleaned of any residual powder and the holder carefully tilted to the vertical to ensure that the powder does not fall out. The packed powder was then presented to the measuring head of the instrument, ensuring that the packed powder surface was aligned with the aperture. After making the measurement, the brass sample holder and powder were removed from the instrument and values of the lightness, chroma and hue angle were tabulated.

The CIELab coordinates of enamels on glaze were measured by applying a transfer to a flat china tile and, after firing, using the ICS-Texicon QMM-2000 instrument with the parameters as described above.

Transfers for on-glaze applications were printed through a 90T screen unless stated otherwise.

All references to zirconyl hydroxide are to that available under the name zirconium hydroxide grade XZO 587/03 from Magnesium Elektron, UK (a subsidiary of Alcan) unless otherwise stated.

X-ray photoelectron spectroscopy data can be recorded on a Kratos XSAM 800 spectrometer, analysing samples using aluminium $K_\alpha$ radiation at 150 W, with an 80 eV pass energy and 7.5 mm slits, a vacuum greater than $10^{-8}$ Torr being employed, the measured binding energies being corrected relative to the C1s reference point at 284.8 eV, and the data quantification being carried out using a Shirley background.

Particle sizes were measured on a Coulter Counter LS100. Room temperature was 20° C.

References in the Examples to starting with particular nominal percentages of Ag with respect to $ZrO_2$ equivalent mean the $ZrO_2$ content in the zirconium starting material is measured after calcination of a sample in air at 900° C. for 2 hours (and hence allowing for loss on ignition), and the % of Ag (calculated from the molecular formula of the silver component) is based on 100 parts by weight of this $ZrO_2$.

EXAMPLE 1

Ball Milled

The preparative route for a Ag—$ZrO_2$ pigmentary material starting with nominally 9 wt % Ag with respect to $ZrO_2$ equivalent—ie 9 parts by weight Ag per 100 parts by weight $ZrO_2$—is provided.

1. 56.11 g of zirconyl hydroxide (71.29% $ZrO_2$) was ball milled for 24 hours with 5.67 g of $AgNO_3$ and 45 ml of acetone, in a 1 pint (0.57 liter) ball mill.
2. The acetone was evaporated off, and the powder dry mixed in a mortar and pestle for 10–15 minutes.
3. The powder was fired at 860° C. for 1 hour in an electrically heated furnace, with a ramp rate of 6.67° C./minute from room temperature. The sample was cooled on removal from the furnace at the firing temperature.
4. The sample was then acid washed in a 1:1 by volume nitric acid:deionised water solution in order to remove any uncombined, or 'free' Ag. The powder was suspended in 300 ml of 1:1 by volume $HNO_3$:$H_2O$ (the $HNO_3$ being AnalaR 69% by weight nitric acid, ie concentrated nitric acid, from BDH, and the water being deionised water) for 1 hour with continual stirring and mild heating (40°–50° C.). The mixture was left to settle out, and the solution decanted off for Ag reclamation. The sample was then re-suspended in 600 ml deionised water and settled out and decanted off as above. This process was continued until the solution decantation proved difficult (after ca two washes). The solution was filtered through a double layer of filter paper (Whatman 541 inside 542) and the sample washed with deionised water until the conductivity of the filtrate was less than 2000 µS.
5. The acid washed powder was then dried at 100° C. A strong pinkish purple powder was obtained, with colour coordinates; L=27.03, a=13.07, b=–16.33, C=20.92 and H=308.67. Chemical analysis of the material identified 2.02% Ag, contained in the $ZrO_2$ lattice. This powder produced a deep pinkish purple colour in on-glaze application on china, with colour coordinates; L=35.69, a=23.03, b=–5.29, C=23.63 and H=347.06.

EXAMPLE 2

Hand Ground

The preparative route for a Ag—$ZrO_2$ pigmentary material starting with nominally 4 wt % Ag with respect to $ZrO_2$ equivalent is provided.

1. 56.11 g of zirconyl hydroxide (71.29% $ZrO_2$) and 2.52 g of $AgNO_3$ were hand ground with acetone in an agate mortar and pestle, for 1 hour.

2. The acetone was evaporated off.
3. The powder was then fired and acid washed as described in Example 1. A purple powder was obtained, with colour coordinates: L=32.42, a=9.94, b=−19.18, C=21.60 and H=297.39. Chemical analysis of the material identified 1.01% Ag, contained in the $ZrO_2$ lattice. This powder produced a strong pinkish purple colour in on-glaze application on china, with colour coordinates: L=41.66, a=28.66, b=−6.39, C=29.36 and H=347.42.

EXAMPLE 3
Aqueous Evaporation

The preparative route for a Ag—$ZrO_2$ pigmentary material starting with nominally 4 wt % Ag with respect to $ZrO_2$ equivalent is provided.
1. 56.11 g of zirconyl hydroxide (71.29% $ZrO_2$) was suspended in 200 ml of deionised water and stirred for 30 minutes.
2. 2.52 g of $AgNO_3$ was dissolved in 30 ml of deionised water and was added to the above suspension, along with washings.
3. The mixture was then heated at ca 75°–85° C., with continual stirring, to evaporate off the water.
4. The resultant powder cake was dried at 100° C.
5. The powder was then dry mixed in a mortar and pestle and fired and acid washed as described in Example 1. A strong purple powder was obtained, with colour coordinates; L=30.11, a=10.32, b=−18.85, C=21.49 and H=298.69. Chemical analysis of the material identified 1.02% Ag, contained in the $ZrO_2$ lattice. This powder produced a purplish pink colour in on-glaze application on china, with colour coordinates: L=47.90, a=27.18, b=−3.96, C=27.47 and H=351.70.

EXAMPLE 4
Freeze Dried

The preparative route for a Ag—$ZrO_2$ pigmentary material starting with nominally 4 wt % Ag with respect to $ZrO_2$ equivalent is provided.
1. 13.96 g of zirconyl hydroxide (71.65% $ZrO_2$) was weighed into a 100 ml round bottom flask.
2. 0.63 g of $AgNO_3$ was dissolved in 15 ml of deionised water and was added to the above zirconyl hydroxide powder, along with washings.
3. The mixture was stirred for 30 minutes and then freeze dried.
4. The resultant voluminous powder was fired and acid washed, as described in Example 1. A strong purple powder was obtained, with colour coordinates; L=29.25, a=9.39, b=−15.52, C=18.14 and H=301.17. Chemical analysis of the material identified 1.46% Ag contained in the $ZrO_2$ lattice.

EXAMPLE 5
Spray Dried

The mixture to be spray dried was prepared by a number of methods as described below. The effect of varying the particle size of the zirconyl hydroxide starting material was investigated, via ball milling and vibro milling techniques. The mode of addition of the $AgNO_3$ was also varied in methods B and C. Similar colours were obtained on firing the samples in electrically heated or gas fired kilns as illustrated in methods F and G, and on firing in open or sealed crucibles as illustrated in methods G and H.

Preparative routes for Ag—$ZrO_2$ pigmentary material starting with nominally 4 wt % Ag with respect to $ZrO_2$ equivalent are provided, unless stated otherwise.

Method A
1. 450 g of 'as-received' (ie un-milled) zirconyl hydroxide powder (70.73% $ZrO_2$), with an average particle size ($D_{50}$) of 15–20 μm, was dispersed in 490 ml of deionised water containing 20.05 g of $AgNO_3$, in a Janke Kunkel stirrer.
2. The mixture was then spray dried, using a spray dryer with an inlet temperature of 200° C. and an outlet temperature of 80° C.
3. The dried powder was calcined at 860° C. for 1 hour in an electrically heated furnace, with a ramp rate of 6.7° C./minute from room temperature, and furnace cooled. The sample was then acid washed as described in Example 1. A pinkish purple powder was obtained, with colour coordinates; L=36.99, a=14.29, b=−20.26, C=24.80 and H=305.20. Chemical analysis of the material identified 0.98% Ag contained in the $ZrO_2$ lattice.

Method B
1. 450 g of zirconyl hydroxide (70.73% $ZrO_2$) was ball milled for 16 hours with 20.05 g of $AgNO_3$ and 360 ml of deionised water, in a 4 pint (2.3 liter) ball mill with 2.5 kg of grinding media, to an average particle size of 3.5 μm.
2. The mixture was spray dried and calcined as described in Example 5, Method A, and then acid washed as described in Example 1. A pinkish purple powder was obtained, with colour coordinates; L=49.45, a=15.93, b=−16.51, C=22.95 and H=313.97. Chemical analysis of the material identified 1.29% Ag contained in the $ZrO_2$ lattice.

Method C
1. 450 g of zirconyl hydroxide (70.73% $ZrO_2$) was ball milled for 16 hours with 360 ml of deionised water, in a 4 pint (2.3 liter) ball mill with 2.5 kg of grinding media, to an average particle size of 3.5 μm.
2. 20.05 g of $AgNO_3$ was then added to the ball mill, and the mixture ground for a further 10 minutes.
3. The mixture was then spray dried and calcined as described in Example 5, Method A, and acid washed as described in Example 1. A pinkish purple powder was obtained (slightly darker than that obtained in method B), with colour coordinates; L=46.93, a=15.25, b=−17.10, C=22.91 and H=311.72. Chemical analysis of the material identified 1.37% Ag contained in the $ZrO_2$ lattice.

Method D
1. 396.50 g of zirconyl hydroxide was ground in a vibro mill with 240 ml of deionised water for 4 hours, to an average particle size of 1.8 μm.
2. The mixture was dried at 80° C., disintegrated and the $ZrO_2$ content calculated thermogravimetrically by heating the sample to 900° C.
3. The powder was then slurried with 590 ml deionised water containing 20.05 g of $AgNO_3$ in a Janke Kunkel stirrer.
4. The mixture was spray dried and fired as described in Example 5, Method A, and then acid washed as described in Example 1. A pinkish purple powder was obtained with colour coordinates; L=41.40, a=13.75, b=−18.49, C=23.04 and H=306.63. Chemical analysis of the material identified 1.51% Ag contained in the $ZrO_2$ lattice. This powder produced a strong pink colour in on-glaze application on china (printed through a 120T screen), with colour coordinates; L=50.51, a=31.10, b=−5.41, C=31.56 and H=350.14.

Method E

The preparative route for a Ag—$ZrO_2$ pigmentary material starting with nominally 7 wt % Ag with respect to $ZrO_2$ equivalent is provided.
1. 1000.0 g of zirconyl hydroxide was ground in a vibro mill with 600 ml of deionised water for 4 hours, to an average particle size of 1.8 μm.

2. The material was dried at 80° C., disintegrated and the $ZrO_2$ content calculated thermogravimetrically by heating the sample to 900° C.
3. The powder was then slurried with 1550 ml of deionised water containing 87.4 g of $AgNO_3$ in a Janke Kunkel stirrer.
4. The mixture was spray dried and calcined as described in Example 5, Method A, and then acid washed as described in Example 1. A dark pinkish purple powder was obtained with colour coordinates: L=31.45, a=12.44, b=−17.35, C=21.35 and H=305.64. Chemical analysis of the material identified 2.05% Ag contained in the $ZrO_2$ lattice. This powder produced a strong purplish pink colour in on-glaze application on china (printed through a 120T screen), with colour coordinates: L=43.70, a=32.36, b=−7.34, C=33.19 and H=347.22.

Method F 1. 396.5 g of zirconyl hydroxide was ground in a vibro mill with 240 ml of deionised water for 8 hours, to an average particle size of 1.2 μm.
2. The mixture was dried at 80° C., disintegrated and the $ZrO_2$ content calculated thermogravimetrically by heating the sample to 900° C.
3. The powder was then slurried with 690 ml of deionised water containing 20.05 g of $AgNO_3$ in a Janke Kunkel stirrer.
4. The mixture was spray dried and fired as described in Example 5, Method A, and then acid washed as described in Example 1. A pinkish purple powder was obtained with colour coordinates: L=49.80, a=15.11, b=−16.89, C=22.66 and H=311.81. Chemical analysis of the material identified 1.45% Ag contained in the $ZrO_2$ lattice. This powder produced a strong pink colour in on-glaze application on china (printed through a 120T screen), with colour coordinates: L=51.22, a=31.05, b=−4.24, C=31.33 and H=352.22.

The Ag—$ZrO_2$ powder and on-glaze colours produced were therefore found to be dependent on the particle size distribution of the pre-fired material. Using the ground zirconyl hydroxide starting material, with an average particle size of 1.2, 1.8 or 3.5 μm, the strongest, darkest, cleanest, powder and on-glaze colours (as viewed by eye) were obtained in the following order 1.8>1.2>3.5 μm. The Ag—$ZrO_2$ pigmentary materials prepared using the 'as-received' zirconyl hydroxide, with an average particle size of 15–20 μm, produced a dark pinkish purple colour, darker than that obtained using zirconyl hydroxide with a $D_{50}$ of 1.8 μm. This powder, however, produced paler pink colours (as viewed by eye) in on-glaze application on china, paler than the colours obtained using zirconyl hydroxide with a $D_{50}$ of 3.5 μm.

There would therefore appear to be an optimum size distribution for the pre-fired material, with the darkness, strength and cleanliness of the on-glaze colour (as viewed by eye) decreasing in the following order; 1.8>1.2>3.5>15–20 μm zirconyl hydroxide.

Method G

1. A sample was prepared as described above in Method F. In this case, however, the spray dried powder was fired in an open crucible, at 860° C. for 1 hour in a gas fired kiln, with a ramp rate of 6.67° C./minute from room temperature, and furnace cooled. The powder was then acid washed as described in Example 1. A pinkish purple colour was obtained, with colour coordinates: L=45.28, a=15.81, b=−18.60, C=24.42 and H=310.37. Chemical analysis of the material identified 1.46% Ag contained in the $ZrO_2$ lattice. This powder produced a strong pink colour in on-glaze application on china (printed through a 120T screen), with colour coordinates: L=51.34, a=28.56, b=−3.70, C=28.80 and H=352.61.

Method H

1. A sample was prepared as described above in Method F. In this case, the powder was fired in a sealed crucible, at 860° C. for 1 hour in a gas fired kiln, with a ramp rate of 6.7° C./minute from room temperature, and furnace cooled. The powder was then acid washed as described in Example 1. A pinkish purple colour was obtained (comparable with that produced in Method G), with colour coordinates: L=44.21, a=14.94, b=−19.79, C=24.79 and H=307.05. Chemical analysis of the material identified 1.43% Ag contained in the $ZrO_2$ lattice. This powder produced a strong pink colour in on-glaze application on china (printed through a 120T screen), with colour coordinates: L=52.27, a=29.73, b=−4.13, C=30.02 and H=352.09.

EXAMPLE 6

Paste Mixed

Preparative routes for Ag—$ZrO_2$ pigmentary material starting with nominally 7 wt % Ag with respect to $ZrO_2$ equivalent are provided.

Method A 1. 1 kg of zirconyl hydroxide (71.29% $ZrO_2$) was ground in a vibro mill with 600 ml of deionised water for 4 hours, to an average particle size of 1.8 μm.
2. The material was dried at 80° C. and disintegrated.
3. The powder was then mixed to an homogeneous paste with 83.0 g of $AgNO_3$ and a limited amount of deionised water, ca 85 ml, in a Mixaco mixer for 2 minutes.
4. 57 g of this paste was fired in a damp form, by the route described in Example 5, Method A, and acid washed as described in Example 1. A dark pinkish purple powder was obtained, with colour coordinates; L=30.52, a=12.75, b=−18.04, C=22.09 and H=305.25. Chemical analysis of the material identified 2.01% Ag contained in the $ZrO_2$ lattice. This powder produced a strong purplish pink colour in on-glaze application on china (printed through a 120T screen), with colour coordinates; L=42.03, a=30.86, b=−7.91, C=31.86 and H=345.62.

Method B

1. In this case, 57 g of the paste prepared as described above in Method A was dried at 80° C. and then fired by the route described in Example 5, Method A. The powder was then acid washed as described in Example 1. A dark pinkish purple powder was obtained (comparable with that obtained in Method A), with colour coordinates; L=30.31, a=13.48, b=−18.42, C=22.83 and H=306.20. Chemical analysis of the material identified 2.03% Ag contained in the $ZrO_2$ lattice. This powder produced a strong purplish pink colour (slightly darker than that obtained in Method A) in on-glaze application on china (printed through a 120T screen), with colour coordinates; L=41.27, a=30.74, b=−7.56, C=31.65 and H=346.19.

EXAMPLE 7

Metal Alloy

The preparative route for a Ag—$ZrO_2$ pigmentary material starting with nominally 4 wt % Ag with respect to $ZrO_2$ equivalent is provided.

1. 10 g of Zr metal was cast in an argon arc with 0.2 g of Ag metal. The alloy was remelted three times.
2. The ingot was crushed in a Tema mill.
3. The sample was then oxidised in air at 1200° C. for 4 hours, with a ramp rate of 20° C./minute from room temperature.
4. A pink friable powder was obtained.

EXAMPLES 8–10

Zirconium Carbonate

Ag—$ZrO_2$ pigmentary materials were prepared using three different sources of zirconium carbonate:

Example 8—MEL 93/175/312 (from Magnesium Elektron, a subsidiary of Alcan, UK) zirconium basic carbonate.

Example 9—Mandoval no 527 (from Mandoval Chemicals, UK) zirconium basic carbonate.

Example 10—Mandoval no 534 (from Mandoval Chemicals, UK) zirconium basic carbonate.

These zirconium carbonates have the following properties:

MEL 93/175/312: CAS number 57219-64-4, supplied as a damped paste of specification:

| | |
|---|---|
| $ZrO_2$ + $HfO_2$ | 39% minimum |
| $HfO_2$ | 1.0% maximum |
| $SO_3$ | 0.30% maximum |
| Na | 0.15% maximum |
| $CO_2$ | 6–9% |

Mandoval no 527 and 534:

| | 527 | 534 |
|---|---|---|
| $ZrO_2$, % | 40.4 | 39.9 |
| Na, % | 0.078 | 0.71 |
| $SO_4$, % | 0.11 | 0.07 |
| $CO_2$, % | 6.4 | 6.3 |
| Fe, parts per million by weight | <10 | <10 |

In each case the pigmentary materials were prepared starting with nominally 4 wt % Ag with respect to $ZrO_2$ equivalent. A description of the preparative route is provided for Example 8, using MEL 93/175/312 zirconium basic carbonate. An identical procedure was conducted in Examples 9 and 10 with the content of the Zr basic carbonate altered accordingly.

EXAMPLE 8

1. 94.12 g of MEL 93/175/713 zirconium basic carbonate (42.5% $ZrO_2$) was ball milled for 24 hours with 2.52 g of $AgNO_3$ and 75 ml of acetone, in a 2 pint (1.14 liter) ball mill.
2. The acetone was evaporated off, and the powder dry mixed in a mortar and pestle for 5–10 minutes.
3. The sample was then fired and acid washed as described in Example 1. A purple pink powder was obtained, with colour coordinates; L=51.54, a=16.30, b=−20.04, C=25.83 and H=309.12. Chemical analysis of the material identified 1.18% Ag, contained in the $ZrO_2$ lattice. The powder produced a pinkish purple colour in on-glaze application on china, with colour coordinates; L=46.79, a=27.73, b=−7.77, C=28.80 and H=344.35.

EXAMPLE 9

An Ag—$ZrO_2$ pigmentary material was prepared as described in Example 8, in this case using 99.010 g of Mandoval no 527 zirconium basic carbonate (40.4% $ZrO_2$) as the Zr source. A pink coloured powder was obtained, with colour coordinates; L=61.65, a=19.55, b=−9.74, C=21.85 and H=333.53. Chemical analysis of the material identified 1.48% Ag, contained in the $ZrO_2$ lattice. The powder produced a pinkish peach colour in on-glaze application on china, with colour coordinates; L=54.23, a=28.34, b=8.08, C=29.47 and H=15.91.

EXAMPLE 10

An Ag—$ZrO_2$ pigmentary material was prepared as described in Example 8, in this case using 100.251 g of Mandoval no 534 zirconium basic carbonate (39.9% $ZrO_2$) as the Zr source. A pale pink powder was obtained, with colour coordinates; L=70.11, a=14.40, b=−9.63, C=17.32 and H=326.22. Chemical analysis of the material identified 0.45% Ag, contained in the $ZrO_2$ lattice. The powder produced a 'flesh-coloured' (light pinkish fawn) material in on-glaze application on china, with colour coordinates; L=78.14, a=12.32, b=17.00, C=21.00 and H=54.08.

The colour variation obtained for the pigmentary materials prepared from the three different Zr basic carbonate sources is thought to be attributed to a combination of particle size variation, the differing type and content of contaminants present in the starting materials, and how the starting materials have been prepared. The different sources give rise to different proportions of tetragonal to monoclinic zirconia in the product, and it is thought that this affects the colour. The presence of Na is also thought to have an effect on the resultant colour obtained; the MEL carbonate contains a maximum of 0.15% Na, whereas Mandoval no 527 contains 0.08% and Mandoval no 534 contains 0.71% Na. The presence of most Na in the Mandoval no 534 Zr carbonate is thought to contribute to the paler powder colour obtained and the associated 'flesh-coloured' shade change noted in on-glaze application.

EXAMPLE 11

An Ag/$ZrO_2$ pigmentary material was prepared using Mandoval no 527 zirconium basic carbonate as the Zr source and silver carbonate as the Ag source.

1. 37.129 g of zirconium basic carbonate (40.4% $ZrO_2$) was ball milled for 24 hours with 0.383 g of $Ag_2CO_3$ with 30 ml of acetone, in a 1 pint (0.57 liter) ball mill.
2. The acetone was evaporated off, and the powder dry mixed in a mortar and pestle for 5–10 minutes.
3. The sample was then fired and acid washed as described in Example 1. A pink red powder was obtained, with colour coordinates; L=86.10, a=8.97, b=−1.54, C=9.10 and H=350.27. Chemical analysis of the material identified 1.21% Ag contained in the $ZrO_2$ lattice. The powder produced a clean pale pink colour in on-glaze application on china (printed through a 120T screen), with colour coordinates; L=80.78, a=11.40, b=7.05, C=13.40 and H=31.72.

EXAMPLE 12

An Ag/$ZrO_2$ pigmentary material was prepared as in Example 11 but using 1.150 g of the silver carbonate. A pink red powder was obtained with colour coordinates; L=50.52, a=23.76, b=−6.65, C=24.67 and H=344.36. Chemical analysis of the material identified 1.83% Ag contained in the $ZrO_2$ lattice. The powder produced a red pink colour in on-glaze application on china (printed through a 120T screen), with colour coordinates; L=52.99, a=30.89, b=11.84, C=33.08, H=20.96.

EXAMPLE 13

An Ag/$ZrO_2$ pigmentary material was prepared using Mandoval no 527 zirconium basic carbonate as the Zr source and silver carbonate as the Ag source.

Method A 1. 49.505 g of zirconium basic carbonate (40.4% $ZrO_2$) was ball milled for 4 hours with 3.069 g of $Ag_2CO_3$ with 50 ml of acetone, in a 1 pint (0.57 liter) ball mill.
2. The acetone was evaporated off, and the powder dry mixed in a mortar and pestle for 5–10 minutes.
3. The sample was then fired and acid washed as described in Example 1. A pink red powder was obtained, with colour coordinates: L=36.11, a=24.99, b=−6.40, C=23.34 and H=344.08. Analysis of the material identified 2.1% Ag, contained in the $ZrO_2$ lattice. The powder produced a strong red purple colour in on-glaze application on china (printed through a 120T screen), with colour coordinates: L=44.95, a=28.66, b=9.06, C=30.06 and H=17.53.

Method B

An Ag/$ZrO_2$ pigmentary material was prepared as in Method A, but in this case the Mandoval no 527 zirconium basic carbonate and silver carbonate were ball milled together for 12 hours. A pink red powder was obtained with colour coordinates: L=38.54, a=24.49, b=−6.39, C=25.31 and H=345.39. Analysis of the material identified 1.8% Ag, contained in the $ZrO_2$ lattice. The powder produced a strong red purple colour in on-glaze application on china (printed through a 120T screen), with colour coordinates; L=45.26, a=31.26, b=9.06, C=30.06 and H=17.53.

Method C

An Ag/$ZrO_2$ pigmentary material was prepared as in Method A, but in this case the Mandoval no 527 zirconium basic carbonate and silver carbonate were ball milled together for 24 hours. A pink red powder was obtained with colour coordinates: L=36.01, a=22.08, b=−6.40, C=22.99 and H=343.84. Analysis of the material identified 2.2% Ag, contained in the $ZrO_2$ lattice. The powder produced a red blue colour in on-glaze application on china (printed through a 120T screen), with colour coordinates; L=41.48, a=29.02, b=6.66, C=29.77 and H=12.92.

EXAMPLE 14

An Ag/$ZrO_2$ pigmentary material was prepared as in Example 11 but using 37.128 g of Mandoval no 527 zirconium basic carbonate (40.4% $ZrO_2$) and 2.876 g of silver carbonate ball milled together for 24 hours. A pink red powder was obtained with colour coordinates; L=45.36, a=27.57, b=−9.40, C=29.12 and H=341.17. Chemical analysis of the material identified 1.85% Ag contained in the $ZrO_2$ lattice. The powder produced a strong red purple colour in on-glaze application on china (printed through a 120T screen), with colour coordinates; L=47.68, a=33.99, b=12.07, C=36.07 and H=19.56.

EXAMPLE 15

An Ag/$ZrO_2$ pigmentary material was prepared as in Example 11 but using 4.026 g of the silver carbonate. A pink red powder was obtained with colour coordinates; L=42.47, a=25.61, b=−13.47, C=28.94 and H=332.25. Chemical analysis of the material identified 1.90% Ag contained in the $ZrO_2$ lattice. The powder produced a strong red purple colour in on-glaze application on china (printed through a 120T screen), with colour coordinates: L=49.65, a=34.60, b=10.31, C=36.10 and H=16.59.

EXAMPLE 16

An Ag/$ZrO_2$ pigmentary material was prepared using Mandoval no 557 zirconium basic carbonate as the $ZrO_2$ source and silver carbonate as the Ag source.

1. 46.915 g of the zirconium basic carbonate (42.63% $ZrO_2$) was ball milled for 24 hours with 3.068 g of $Ag_2CO_3$ and 50 ml of acetone, in a 1 pint (0.57 liter) ball mill.
2. The acetone was evaporated off, and the powder dry-mixed in a mortar and pestle for 5–10 minutes.
3. The sample was then fired and acid washed as described in Example 1. A reddish pink powder was obtained with colour coordinates: L=44.34, a=23.88, b=−3.91, C=24.20 and H=350.71. Chemical analysis of the material identified 3.62% Ag contained in the $ZrO_2$ lattice. The powder produced a strong peach/purple colour in on-glaze china (printed through a 120T screen), with colour coordinates: L=47.05, a=30.49, b=13.03, C=33.16 and H=23.14.

EXAMPLE 17

An Ag/$ZrO_2$ pigmentary material was prepared as described in Example 16, but in this case using 4.602 g of $Ag_2CO_3$. A reddish pink powder was obtained with colour coordinates: L=47.09, a=26.77, b=−7.69, C=27.85 and H=343.98. Chemical analysis of the material identified 3.41% Ag contained in the $ZrO_2$ lattice. The powder produced a peach/pink colour in on-glaze application on china (printed through a 120T screen), with colour coordinates: L=54.28, a=32.55, b=16.59, C=36.54 and H=27.00.

EXAMPLE 18

An Ag/$ZrO_2$ pigmentary material was prepared using Mandoval no 527 zirconium basic carbonate as the Zr source and silver(I) oxide ($Ag_2O$) as the Ag source.

1. 37.129 g of zirconium basic carbonate (40.4% $ZrO_2$) was ball milled for 24 hours with 0.322 g of $Ag_2O$ with 30 ml of acetone, in a 1 pint (0.57 liter) ball mill.
2. The acetone was evaporated off, and the powder dry mixed in a mortar and pestle for 5–10 minutes.
3. The sample was then fired and acid washed as described in Example 1. A pink powder was obtained, with colour coordinates: L=83.45, a=12.05, b=−1.49, C=12.14 and H=352.93. Analysis of the material identified 1.09% Ag, contained in the $ZrO_2$ lattice. The powder produced a clean pale pink colour in on-glaze application on china (printed through a 120T screen), with colour coordinates: L=78.36, a=14.41, b=7.79, C=16.38 and H=28.38.

EXAMPLE 19

An Ag/$ZrO_2$ pigmentary material was prepared as in Example 18 but using 0.644 g of the silver oxide. A pink red powder was obtained with colour coordinates; L=61.94, a=21.66, b=−4.52, C=22.13 and H=348.22. Analysis of the material identified 1.44% Ag, contained in the $ZrO_2$ lattice. The powder produced a red pink colour in on-glaze application on china (printed through a 120T screen), with colour coordinates; L=59.50, a=28.00, b=15.17, C=31.85 and H=28.44.

EXAMPLE 20

An Ag/$ZrO_2$ pigmentary material was prepared as in Example 18 but using 1.449 g of the silver oxide. A pink red powder was obtained with colour coordinates; L=49.87, a=27.33, b=−6.14, C=28.01 and H=347.33. Analysis of the material identified 1.78% Ag, contained in the $ZrO_2$ lattice. The powder produced a strong red purple colour in on-glaze application on china (printed through a 120T screen), with colour coordinates; L=51.53, a=32.88, b=12.29, C=35.10 and H=20.50.

EXAMPLE 21

Zirconium Alkoxide

The preparative route for a Ag—$ZrO_2$ pigmentary material starting with nominally 4 wt % Ag with respect to $ZrO_2$ equivalent is provided. In this case, zirconium butoxide is used as the $ZrO_2$ source; however, colours have also been produced using alternative zirconium alkoxides, eg zirconium propoxide.

1. 155.72 g of 80% $Zr[O(CH_2)_3CH_3]_4$ solution was diluted with 100 g of isopropanol.
2. 2.52 g of $AgNO_3$ was dissolved in 200 ml of deionised water.
3. The $Zr[O(CH_2)_3CH_3]_4$ solution was added slowly to the aqueous $AgNO_3$ with continual stirring. A cream precipitate was produced.
4. The solution was then evaporated off, with stirring and heating (75°–85° C.), and the resultant powder cake dried at 100° C.
5. The powder was then dry mixed in a mortar and pestle, and fired and acid washed as described in Example 1. A lilac/grey powder was obtained, with colour coordinates; L=72.78, a=2.83, b=−10.88, C=11.24 and H=284.57. Chemical analysis of the material identified 1.0% Ag, contained in the $ZrO_2$ lattice. The powder produced a pale pink colour in on-glaze application on china, with colour coordinates; L=81.90, a=8.04, b=2.37, C=8.39 and H=16.44.

EXAMPLE 22
Ag(I) Oxide

Preparative routes for Ag—$ZrO_2$ pigmentary material starting with nominally 7 wt % Ag with respect to $ZrO_2$ equivalent are provided.

Method A 1. 57.0 g of zirconyl hydroxide was wet mixed with 3.0 g of $Ag_2O$ and 40 ml of water in a planetary mill for 10 minutes.
2. The mixture was then dried at 80° C. and disintegrated in a coffee grinder.
3. The powder was fired as described in Example 5, Method A, and then acid washed as described in Example 1. A strong pinkish purple powder was obtained, with colour coordinates; L=34.84, a=14.02, b=−16.31, C=21.51 and H=310.68. Chemical analysis of the material identified 1.57% Ag contained in the $ZrO_2$ lattice. This powder produced a strong pink colour in on-glaze application on china (printed through a 120T screen), with colour coordinates; L=48.58, a=32.60, b=−4.90, C=32.97 and H=351.46.

Method B 1. 396.50 g of zirconyl hydroxide was ground in a vibro mill with 240 ml of deionised water for 4 hours, to an average particle size of 1.8 μm.
2. The material was dried at 80° C. and disintegrated and the $ZrO_2$ content calculated thermogravimetrically by heating the sample to 900° C.
3. 53.1 g of this pre-ground zirconyl hydroxide was wet mixed with 3.0 g of $Ag_2O$ and 40 ml of water in a planetary mill for 10 minutes.
4. The mixture was then dried at 80° C. and disintegrated in a coffee grinder.
5. The powder was fired as described in Example 5, Method A, and then acid washed as described in Example 1. A strong pinkish purple powder was obtained (pinker than that obtained in Method A) with colour coordinates; L=40.35, a=18.37, b=−16.25, C=24.53 and H=318.52. Chemical analysis of the material identified 1.88% Ag contained in the $ZrO_2$ lattice. This powder produced a strong pink colour (a stronger colour than that obtained in Method A) in on-glaze application on china (printed through a 120T screen), with colour coordinates; L=47.12, a=33.80, b=−3.21, C=33.95 and H=354.57.

Method C

In this example, zirconyl hydroxide refers to zirconium hydroxide obtained from Magnesium Elektron, grade XZO 587 (as opposed to grade XZO 587/03 used in Methods A and B).

1. 52.18 g of zirconyl hydroxide (38.33% $ZrO_2$) was ball milled for 5 hours with 1.51 g of $Ag_2O$ and 45 ml of acetone, in a 1 pint (0.57 liter) ball mill.
2. The acetone was evaporated off, and the powder dry mixed in a mortar and pestle for 10–15 minutes.
3. The powder was fired as described in Example 5, Method A, and then acid washed as described in Example 1. A strong purplish pink powder was obtained with colour coordinates; L=39.37, a=20.32, b=−15.48, C=25.54 and H=322.71. Chemical analysis of the material identified 2.31% Ag, contained in the $ZrO_2$ lattice. This powder produced a strong reddish purple colour in on-glaze application on porcelain, with colour coordinates; L=39.91, a=28.69, b=−2.63, C=28.81 and H=354.76 (printed through a 120T screen).

EXAMPLE 23
Ag Carbonate

The preparative route for a Ag—$ZrO_2$ pigmentary material starting with nominally 9 wt % Ag with respect to $ZrO_2$ equivalent is provided.

1. 56.11 g of zirconyl hydroxide (71.29% $ZrO_2$) was ball milled for 24 hours with 4.60 g of $Ag_2CO_3$ and 45 ml of acetone, in a 1 pint (0.57 liter) ball mill.
2. The acetone was evaporated off, and the powder dry mixed in a mortar and pestle for 10–15 minutes.
3. The powder was then fired and acid washed as described in Example 1. A strong purplish pink powder was obtained, with colour coordinates; L=38.88, a=18.81, b=−13.31, C=23.04 and H=324.72. Chemical analysis of the material identified 1.57% Ag contained in the $ZrO_2$ lattice. This sample produced a reddish pink colour in on-glaze application on china, with colour coordinates; L=43.10, a=28.84, b=0.51, C=28.84 and H=1.02.

EXAMPLE 24
Ag Powder

The preparative route for a Ag—$ZrO_2$ pigmentary material starting with nominally 7 wt % Ag with respect to $ZrO_2$ equivalent is provided.

1. 55.83 g of zirconyl hydroxide (71.65% $ZrO_2$) and 2.80 g of silver powder (Johnson Matthey, Cap 9) were hand ground with acetone in an agate mortar and pestle for 1 hour.
2. The acetone was evaporated off.
3. The powder was then fired and acid washed as described in Example 1. A pinkish purple powder was obtained, with colour coordinates; L=38.70, a=11.65, b=−20.81, C=23.85 and H=299.23. Chemical analysis of the material identified 1.24% Ag, contained in the $ZrO_2$ lattice. This powder produced a pink colour in on-glaze application on china, with colour coordinates; L=52.94, a=26.35, b=−4.79, C=26.78 and H=349.70.

EXAMPLE 25
Ag Lactate

The preparative route for a Ag—$ZrO_2$ pigmentary material starting with nominally 4 wt % Ag with respect to $ZrO_2$ equivalent is provided.

1. 21.04 g of zirconyl hydroxide (71.29% $ZrO_2$) and 1.20 g of Ag lactate were hand ground with acetone, in an agate mortar and pestle for 30 minutes.
2. The acetone was evaporated off.

3. The powder was then fired and acid washed as described in Example 1. A strong pinkish purple powder was obtained, with colour coordinates: L=29.41, a=12.75, b=−13.70, C=18.72 and H=312.95. Chemical analysis of the material identified 1.17% Ag, contained in the $ZrO_2$. This powder produced a pink colour in on-glaze application on china, with colour coordinates: L=47.54, a=25.16, b=−1.39, C=25.20 and H=356.83.

EXAMPLE 26–37

Alternative Ag Sources

Ag—$ZrO_2$ samples were prepared using a variety of alternative Ag sources in Examples 26–37, the powder colour coordinates of which are given in Table 1. In each case, the samples were prepared starting with nominally 4 wt % Ag with respect to $ZrO_2$ equivalent, following the experimental procedure described in Example 25, with the content of the Ag source altered accordingly. A range of pinkish purple to purple powders were obtained in Examples 26–32, whereas a range of pale pink to 'off-white' powders were produced in Examples 33–37. The colour coordinates quoted in Examples 34–37 are of the calcined powder prior to acid washing. The Ag contents given in the Table are as shown by chemical analysis of the material after acid washing (and hence the silver is in the $ZrO_2$ lattice).

TABLE 1

Varying the Ag Source

| Example number | Ag Source | Powder Colour Coordinates | | | | | % Ag |
|---|---|---|---|---|---|---|---|
| | | L | a | b | C | H | |
| 26 | Ag(I) oxide | 30.61 | 12.69 | −15.32 | 19.89 | 309.63 | 1.12 |
| 27 | Ag(II) oxide | 42.39 | 16.13 | −18.25 | 24.36 | 311.47 | 0.92 |
| 28 | Ag acetate | 28.99 | 12.73 | −12.87 | 18.10 | 314.67 | 1.45 |
| 29 | Ag laurate | 42.17 | 19.21 | −15.52 | 24.70 | 321.05 | 0.46 |
| 30 | Ag stearate | 32.16 | 13.98 | −17.31 | 22.25 | 308.94 | 0.78 |
| 31 | Ag nitrite | 32.30 | 11.26 | −18.44 | 21.61 | 301.40 | 1.10 |
| 32 | Ag citrate | 42.03 | 16.88 | −17.86 | 24.57 | 313.39 | 0.73 |
| 33 | Ag chloride | 84.96 | 1.91 | −3.21 | 3.74 | 300.78 | — |
| 34 | Ag sulphate | 57.23 | 13.88 | −8.79 | 16.43 | 327.67 | — |
| 35 | Ag sulphide | 75.88 | 7.65 | −5.86 | 9.64 | 322.55 | — |
| 36 | Ag phosphate | 73.47 | 5.42 | −0.19 | 5.43 | 358.03 | — |
| 37 | Ag perchlorate | 88.40 | 0.07 | 3.03 | 3.03 | 88.63 | — |

EXAMPLE 38–43

Varying the Ag Loading

Ag—$ZrO_2$ pigmentary materials were prepared starting with nominal Ag loadings of 1, 4, 7, 9, 10, 20, 30, 40 and 50 wt % Ag with respect to $ZrO_2$ equivalent. The strength and darkness of the pigment colour, after acid washing, was found to increase with Ag loading up to a certain limit and then decrease with additional Ag. Pale powder colours were obtained at the two extreme limits; with a pale pink powder produced with 1% Ag and a pale lilac powder produced with 50% Ag. In the intermediate % range, strong pinkish purple pigments were obtained with an Ag loading of 4–20% Ag, with the strongest, darkest, colours (as viewed by eye) produced with 7–10% Ag.

The colour coordinates of a selection of these powders are presented in Table 2. In each case, the pigmentary materials were prepared by ball milling zirconyl hydroxide with the appropriate amount of $AgNO_3$ and acetone, for 24 hours in a 1 pint (0.57 liter) ball mill, followed by evaporation, calcination and then acid washing as described in Example 1. The specific preparative details for the production of an Ag—$ZrO_2$ pigmentary material starting with nominally 9 wt % Ag with respect to $ZrO_2$ equivalent is given in Example 1; its colour coordinates are repeated here for comparison. The same experimental conditions were employed for Examples 38–43, with the content of $AgNO_3$ altered accordingly. The Table also gives the content of silver as shown by chemical analysis of the material obtained after acid washing (and hence the silver is in the $ZrO_2$ lattice).

It can be seen that the %Ag in the $ZrO_2$ lattice is highest when starting with a nominal Ag loading of 4–20%, in particular 7–10%, with respect to $ZrO_2$ equivalent, and that this is the same range as results in the darkest colours.

TABLE 2

Varying the Ag Loading

| Example number | % Ag with respect to $ZrO_2$ equivalent | Powder Colour Coordinates | | | | | % Ag after acid washing |
|---|---|---|---|---|---|---|---|
| | | L | a | b | C | H | |
| 38 | 1 | 89.71 | 2.19 | 1.38 | 2.59 | 32.22 | 0.63 |
| 39 | 4 | 37.44 | 14.09 | −18.42 | 23.19 | 307.42 | 1.32 |
| 1 | 9 | 27.03 | 13.07 | −16.33 | 20.92 | 308.67 | 2.02 |
| 40 | 10 | 28.35 | 12.67 | −14.95 | 19.59 | 310.28 | 2.22 |
| 41 | 20 | 34.66 | 9.98 | −16.28 | 19.10 | 301.50 | 1.40 |
| 42 | 30 | 52.40 | 6.39 | −12.60 | 14.13 | 296.90 | 0.60 |
| 43 | 40 | 70.59 | 3.27 | −7.67 | 8.33 | 293.09 | 0.47 |

EXAMPLES 44–47

Effect of Milling

The effect of ball milling the pre-fired $AgNO_3$/zirconyl hydroxide starting materials for varying lengths of time was investigated.

Ag—$ZrO_2$ pigmentary materials were prepared starting with nominally 9 wt % Ag with respect to $ZrO_2$ equivalent, by ball milling zirconyl hydroxide and $AgNO_3$ with acetone for 1, 4 or 24 hours; Examples 44, 45 and 1 respectively. The specific preparative details for the Ag—$ZrO_2$ pigmentary material produced with 24 hours grinding is given in Example 1. The same route was conducted in Examples 44 and 45 with the ball milling time altered accordingly.

A strong pinkish purple powder was obtained for the sample prepared with 1 hour ball milling. A stronger, pinker, slightly lighter, powder was produced with longer ball milling, particularly for a 24 hour period. The powder colour coordinates obtained with 1, 4 and 24 hour ball milling are given in Table 3(a), with their corresponding china on-glaze colour coordinates given in Table 3(b). Table 3(a) also shows the % Ag in the lattice, as indicated by chemical analysis after acid washing.

TABLE (3a)

Effect of Milling

| Example number | Time in the ball mill/hrs | Powder Colour Coordinates | | | | | % Ag after acid washing |
|---|---|---|---|---|---|---|---|
| | | L | a | b | C | H | |
| 44 | 1 | 24.18 | 8.68 | −11.14 | 14.12 | 307.91 | 1.63 |
| 45 | 4 | 24.51 | 10.23 | −11.27 | 15.22 | 312.25 | 1.99 |
| 1 | 24 | 27.03 | 13.07 | −16.33 | 20.92 | 308.67 | 2.02 |

TABLE (3b)

Effect of Milling

| Example number | Time in the ball mill/hrs | China On-glaze Colour Coordinates | | | | |
|---|---|---|---|---|---|---|
| | | L | a | b | C | H |
| 44 | 1 | 37.68 | 25.13 | −4.49 | 25.53 | 349.87 |
| 45 | 4 | 37.01 | 23.35 | −3.62 | 23.63 | 351.19 |
| 1 | 24 | 35.69 | 23.03 | −5.29 | 23.63 | 347.06 |

TABLE (4b)

Effect of Milling

| Example number | Time in the ball mill/hrs | China On-glaze Colour Coordinates | | | | |
|---|---|---|---|---|---|---|
| | | L | a | b | C | H |
| 46 | 1 | 80.25 | 12.82 | 0.91 | 12.85 | 4.05 |
| 47 | 4 | 81.45 | 8.55 | 3.66 | 9.30 | 23.17 |
| 38 | 24 | 86.16 | 1.73 | 4.97 | 5.27 | 70.83 |

It can be seen from Table 3(a) that ball milling for longer resulted in a higher % Ag in the lattice of the pigmentary material, and that this corresponds to a higher chroma.

The powders produced strong pinkish purple on-glaze colours on china. In this case, the darker colour was obtained with increasing grinding; 24 hours darker than 4 hours, in turn darker than 1 hour, ball milling.

A similar effect was noted on varying the particle size of the zirconyl hydroxide starting material used to prepare Ag—$ZrO_2$ pigmentary material starting with nominally 4 wt % Ag with respect to $ZrO_2$ equivalent; Example 5, methods A–F. The darkness, strength and cleanliness of the china on-glaze colour (as viewed by eye) was found to decrease, with respect to the zirconyl hydroxide particle size, in the following order; 1.8>1.2>3.5>15–20 μm zirconyl hydroxide. There would therefore appear to be an optimum size distribution for the pre-fired Ag—$ZrO_2$ starting material.

In contrast, limited or no grinding was found to be better for preparing Ag—$ZrO_2$ pigmentary materials starting with a low nominal Ag loading of ca 1 wt % with respect to $ZrO_2$ equivalent.

Ag—$ZrO_2$ pigmentary materials were prepared starting with nominally 1 wt % Ag with respect to $ZrO_2$ equivalent, by ball milling zirconyl hydroxide and $AgNO_3$ with acetone for 1, 4 and 24 hours, Examples 46, 47 and 38 respectively. The specific preparative details are as given in Example 1, with the Ag loading and ball milling time altered accordingly.

Pale pink powder and china on-glaze colours were produced in each case, with the colour strength and darkness decreasing with increased grinding; 1 hour darker than 4 hours, in turn darker than 24 hours, ball milling. In this case, it is proposed that the increased surface area obtained with decreased particle size is detrimental to stronger, darker, colour formation with low Ag loadings, due to insufficient Ag being available for reaction.

TABLE (4a)

Effect of Milling

| Example number | Time in the ball mill/hrs | Powder Colour Coordinates | | | | | % Ag after acid washing |
|---|---|---|---|---|---|---|---|
| | | L | a | b | C | H | |
| 46 | 1 | 82.96 | 6.05 | −6.75 | 9.07 | 311.86 | 0.44 |
| 47 | 4 | 87.07 | 3.17 | −3.20 | 4.51 | 314.80 | 0.52 |
| 38 | 24 | 89.71 | 2.19 | 1.38 | 2.59 | 32.22 | 0.63 |

EXAMPLES 48–57

Varying the Firing Conditions

A standard firing cycle of 860° C. for 1 hour, with a ramp rate of 6.7° C./minute from room temperature was employed for the Ag—$ZrO_2$ pigmentary material preparation. The samples were cooled either on removal from the furnace at temperature, ie air quenched, or furnace cooled. A number of variations to this standard firing cycle were investigated, as described below.

Firing Temperature

A series of Ag—$ZrO_2$ pigmentary materials were prepared by firing the starting material at 650°, 750°, 810°, 860°, 910°, 1000°, 1100° or 1300° C. for 1 hour, with a standard ramp rate of 6.7° C./minute from room temperature. In each case, the powder was cooled on removal from the furnace at temperature, except that the 1100° and 1300° C. materials were allowed to cool to 1000° C. before removal from the furnace. 20 g of pigmentary material was produced by hand grinding zirconyl hydroxide with $AgNO_3$ as described in Example 2, with the calcination temperature altered accordingly.

A strong dark pinkish purple powder was obtained at 650° C., however this powder yielded a dirty pinkish purple colour in on-glaze application. A similar coloured powder was produced on firing at 750° C. Strong purple colours were produced on firing at 810°–910° C., with a slightly lighter pigmentary material prepared on firing at 910° C. Paler pinkish purple powders were obtained on firing at higher temperatures of 1000°–1300° C., with a decrease in the darkness of the pigment noted with increasing firing temperature. The powder coordinates of a selection of these pigmentary materials are provided in Table 5.

Ag—$ZrO_2$ pigmentary materials can therefore be prepared with a calcination temperature at least in the range 650°–1300° C., with improved colours prepared in the range 750°–950° C., in particular on calcining at 800°–910° C.

TABLE 5

Firing Temperature

| Example number | Calcination Temp/°C. | Powder Colour Coordinates | | | | | % Ag after acid washing |
|---|---|---|---|---|---|---|---|
| | | L | a | b | C | H | |
| 48 | 750 | 25.11 | 9.00 | −8.84 | 12.62 | 315.52 | 1.59 |
| 49 | 860 | 28.83 | 9.50 | −16.93 | 19.42 | 299.30 | 1.25 |
| 50 | 1000 | 39.08 | 12.81 | −18.55 | 22.54 | 304.62 | 0.55 |
| 51 | 1100 | 43.87 | 12.97 | −16.76 | 21.19 | 307.73 | 0.39 |

Ramp Rates

The ramp rate of 6.7° C./minute from room temperature to 860° C., employed for Ag—$ZrO_2$ pigmentary material preparation, takes roughly 2 hours 5 minutes to complete. Samples were also fired with varying rates of rise to temperature; at 13.9°, 3.5° and 1.7° C./minute with the sample taking roughly 1.4 and 8 hours to reach 860° C. respectively. The samples were prepared starting with nominally 7 wt % Ag with respect to $ZrO_2$ equivalent, by spray drying preground material, calcining and acid washing as described in Example 5, Method E, with the ramp rate altered accordingly.

Powder colour coordinates for Ag—$ZrO_2$ pigmentary materials prepared with a 1, 2, 4 or 8 hour rise to temperature, 860° C., are given in Table 6. A comparable strong pinkish purple powder was obtained in each case. The rate of rise to temperature would therefore not appear to be critical over the heating rate studied, of 1–8 hours duration.

The Ag—$ZrO_2$ pigmentary materials prepared with a 4 hour rise to 860° C., however, was found to yield a slightly better china on-glaze colour than those prepared with a 1, 2 or 8 hours rise to temperature.

TABLE 6

| Example number | Time to Temp/hrs | Powder Colour Coordinates | | | | | % Ag after acid washing |
|---|---|---|---|---|---|---|---|
| | | L | a | b | C | H | |
| 52 | 1 | 30.35 | 12.99 | −17.19 | 21.54 | 307.07 | 2.03 |
| 53 | 2 | 29.92 | 12.85 | −16.52 | 20.93 | 307.89 | 2.15 |
| 54 | 4 | 29.67 | 12.95 | −16.12 | 20.68 | 308.78 | 2.34 |
| 55 | 8 | 30.14 | 12.91 | −16.16 | 20.68 | 308.62 | 2.35 |

Time at Temperature

Firing cycles involving a 1 hour soak period at 860° C. before cooling the samples have been described above. A sample was also fired with a longer soak time of 20 hours at 860° C. for comparison.

EXAMPLE 56

A 20 g homogeneous mixture of $AgNO_3$/zirconyl hydroxide, obtained starting with nominally 4 wt % Ag with respect to $ZrO_2$ equivalent was prepared by hand grinding the starting materials with acetone as described in Example 2. The powder was then fired at 860° C. for 20 hours, with a ramp rate of 6.7° C./minute from room temperature and cooled on removal from the furnace at temperature. The material was then acid washed as described in Example 1. A strong purple powder was obtained, with colour coordinates; L=33.74, a=11.55, b=−16.62, C=20.24 and H=304.79. Chemical analysis of the material identified 0.87% Ag contained in the $ZrO_2$ lattice. This powder is lighter and slightly pinker than that obtained using the firing cycle with a 1 hour soak at 860° C. (cf Example 49; L=28.33, a=9.50, b=−16.93, C=19.42 and H=299.30, containing 1.25% Ag in the $ZrO_2$ lattice). Analysis of the two products identified a higher Ag content, maintained after acid washing, for that prepared with a 1 hour calcination, Example 49.

Shorter soak times at 860° C. would therefore appear to be better.

Two-Step Calcination Cycles

Thermal analysis data indicates that amorphous zirconyl hydroxide begins to crystallise at ca 370° C. Alternative calcination cycles were therefore conducted involving an initial 1 hour soak at a temperature below the $ZrO_2$ crystallisation point followed by a further 1 hour soak at 860° C. to crystallise the material, in an attempt to retain more Ag in the final product.

EXAMPLES 57A and 57B

Ag—$ZrO_2$ pigmentary materials were prepared starting with nominally 4 wt % Ag with respect to $ZrO_2$ equivalent.

The samples were prepared by hand grinding $AgNO_3$ and zirconyl hydroxide as described in Example 2. A two-stage calcination was then conducted as set out below:

Example 57A: 6.7° C./minute to 300° C., 1 hour soak at 300° C., 6.7° C./minute to 860° C., 1 hour soak at 860° C.

Example 57B: 6.7° C./minute to 500° C., 1 hour soak at 500° C., 6.7° C./minute to 860° C., 1 hour soak at 860° C.

In each case, the samples were cooled on removal from the furnace at temperature and then acid washed as described in Example 1. The powder colour coordinates for the two samples are given in Table 7 together with the colour coordinates for a pigmentary material obtained with a one-stage firing cycle, Example 49, for comparison. The pigmentary materials prepared with the two-stage calcination cycle were found to be paler and pinker than that obtained with the one-stage firing cycle, with the sample fired at 300°/860° C. being considerably paler than the one-stage material. A decrease in Ag content was identified for the samples prepared with the two-stage firing.

Under the conditions studied, a one-stage firing cycle would appear to be better.

TABLE 7

| | Two-Step Calcination Cycles | | | | | | |
|---|---|---|---|---|---|---|---|
| Example number | Initial Soak Temp/°C. | Final Soak Temp/°C. | Powder Colour Coordinates | | | | % Ag after acid washing |
| | | | L | a | b | C | H | |
| 57A | 300 | 860 | 47.22 | 16.60 | −19.41 | 25.54 | 310.52 | 0.91 |
| 57B | 500 | 860 | 30.32 | 13.17 | −19.81 | 23.79 | 303.61 | 0.99 |
| 49 | — | 860 | 28.83 | 9.50 | −16.93 | 19.42 | 299.30 | 1.25 |

EXAMPLES 58 and 59

Cooling Technique

A variation in powder colour was obtained on varying the rate of sample cooling. In general, a darker colour was produced with rapid cooling, via air quenching, on removal from the furnace at the calcination temperature. Example 58 highlights the colour difference obtained on air quenching (Method A) or furnace cooling (Method B) the sample. A pinkish shade change was noted on quenching the samples directly into water, as illustrated in Example 59.

EXAMPLE 58

Air Quenching Compared With Furnace Cooling

The preparative route for an Ag—$ZrO_2$ pigmentary material starting with nominally 4 wt % Ag with respect to $ZrO_2$ equivalent is provided.

1. 56.11 g of zirconyl hydroxide (71.29% $ZrO_2$) was ball milled for 4 hours with 2.52 g of $AgNO_3$ and 45 ml of acetone, in a 1 pint (0.57 liter) ball mill.
2. The acetone was evaporated off, and the powder dry mixed in a mortar and pestle for 10–15 minutes.
3. The powder was then split into two batches and fired as described below;

Method A 29.31 g of powder was fired at 860° C. for 1 hour, with a heating rate of 6.7° C./minute from room temperature. The sample was cooled on removal from the furnace at temperature, ie air quenched, and then acid washed as described in Example 1. A pinkish purple powder was obtained, with colour coordinates; L=34.59, a=15.32, b=−16.86, C=22.78 and H=312.27. Chemical analysis of the material identified 1.24% Ag contained in the $ZrO_2$ lattice.

Method B 29.31 g of powder was fired at 860° C. for 1 hour, with a ramp rate of 6.7° C./minute from room temperature. In this case, the sample was furnace cooled and then acid washed as described in Example 1. A pinkish purple powder was obtained, with colour coordinates L=40.91, a=16.27, b=−16.25, C=23.00 and H=315.02. Chemical analysis of the material identified 1.27% Ag contained in the $ZrO_2$ lattice.

A paler powder was therefore obtained on cooling the samples to room temperature in the furnace.

EXAMPLE 59

Air Quenching Compared With Water Quenching

The preparative route for an Ag—$ZrO_2$ pigmentary material starting with nominally 4 wt % Ag with respect to $ZrO_2$ equivalent is provided.

1. 42.08 g of zirconyl hydroxide (71.29% $ZrO_2$) and 1.89 g of $AgNO_3$ were hand ground with acetone in an agate mortar and pestle, for 1 hour.
2. The acetone was evaporated off.
3. The powder was then split into two batches and fired as described below;

Method A 21.98 g of powder was fired at 860° C. for 1 hour, with a ramp rate of 6.7° C./minute from room temperature. The sample was cooled on removal from the furnace at temperature, ie air quenched, and then acid washed as described in Example 1. A purple powder was obtained, with colour coordinates; L=28.83, a=9.50, b=−16.93, C=19.42 and H=299.30. Chemical analysis of the material identified 1.25% Ag contained in the $ZrO_2$ lattice.

Method B 21.98 g of powder was fired at 860° C. for 1 hour, with a ramp rate of 6.7° C./minute from room temperature. The sample was cooled by direct immersion into cold water from the calcination temperature. The water was then decanted off and the sample acid washed as described in Example 1. A pinkish purple powder was obtained, with colour coordinates; L=29.00, a=13.53, b=−13.52, C=19.13 and H=315.01. Chemical analysis of the material identified 1.08% Ag contained in the $ZrO_2$ lattice.

EXAMPLE 60

Acid Washing

The fired powders were washed in a solution of 1:1 nitric acid:deionised water in order to remove any uncombined or 'free' silver.

Washing Procedure

The powder (40–50 g) was suspended in 1:1 by volume $HNO_3$:$H_2O$ (deionised, 300 ml) for 1 hour with continual stirring and mild heating (ca 40°–50° C.). The mixture was left to settle out and the solution decanted off for Ag reclamation. The sample was then re-suspended in deionised water (ca 600 ml) and settled out and decanted off as above. This process was continued until the solution decantation proved difficult (after ca two washes). The solution was then filtered through a double layer of filter paper (Whatman 541 inside 542) and the sample washed with deionised water until the conductivity of the filtrate was less than 2000 μS.

Advantages of washing the samples;

a) enables the unused Ag to be reclaimed.

b) unwashed samples yield paler, generally dirtier colours for on-glaze applications, c) unwashed samples yield yellowish brown discolouration for glass application.

An Example is provided in order to illustrate the different powder and on-glaze colours obtained for a washed and an unwashed sample:

The preparative route for an Ag—$ZrO_2$ pigmentary material starting with nominally 4 wt % Ag with respect to $ZrO_2$ equivalent is provided.

1. 55.83 g of zirconyl hydroxide (71.65% $ZrO_2$) was ball milled for 24 hours with 2.52 g of $AgNO_3$ and 45 ml of acetone, in a 1 pint (0.57 liter) ball mill.
2. The acetone was evaporated off, and the powder dry mixed in a mortar and pestle for 10–15 minutes.
3. The powder was then fired as described in Example 1. A purple/grey powder was obtained, with colour coordinates; L=33.85, a=9.92, b=−13.09, C=16.42 and H=307.18. Analysis of this sample identified 4 wt % Ag. The powder yielded a slightly dirty, purplish pink colour in on-glaze application on china, with colour coordinates; L=40.41, a=23.99, b=−2.42, C=24.11 and H=354.24.
4. Half of the calcined powder was then acid washed to remove any uncombined Ag, as described in Example 1. A pinkish purple powder was obtained, with colour coordinates; L=40.74, a=16.27, b=−19.08, C=25.07 and H=310.46. Analysis of this powder identified 1.4 wt % Ag contained in the zirconia lattice. Some of the Ag detected prior to acid washing was therefore in an uncombined or 'free' form. The powder yielded a cleaner, purplish pink colour in on-glaze application on china (in comparison with the unwashed sample), with colour coordinates; L=39.84, a=24.75, b=−2.56, C=24.88 and H=354.09.

The Ag—$ZrO_2$ pigmentary materials can therefore be used unwashed but in general, better quality, stronger and cleaner, colours are obtained after acid-washing. The washing process seems to be desirable particularly for glass application, in order to avoid brown discolourations.

EXAMPLES 61 and 62

Calcining in Different Atmospheres

A variation from the colour of the air-fired powder was obtained on calcining in alternative atmospheres. Examples are given for $N_2$ and $H_2/N_2$ calcinations.

EXAMPLE 61

Nitrogen Firing

The preparative route for an Ag—$ZrO_2$ pigmentary material starting with nominally 7 wt % Ag with respect to $ZrO_2$ equivalent is provided.

1. 55.83 g of zirconyl hydroxide (71.65% $ZrO_2$) was suspended in 200 ml of deionised water and stirred for 30 minutes.
2. 4.41 g of $AgNO_3$ was dissolved in 30 ml of deionised water and was added to the above suspension together with washings.
3. The mixture was then heated at ca 75°–85° C., with continual stirring, to evaporate off the water.
4. The resultant powder cake was dried at 100° C., and then dry mixed in a mortar and pestle for ca 5 minutes.
5. The sample was calcined at 860° C. for 1 hour in a dynamic $N_2$ atmosphere, with a ramp rate of 6.7° C./minute from room temperature, and then furnace cooled in the $N_2$ atmosphere. The sample was acid washed as described in Example 1. A burgundy/brown powder was obtained, with colour coordinates; L=22.22, a=11.04, b=−1.39, C=11.13 and H=352.80. Chemical analysis of the material identified 1.67% Ag contained in the $ZrO_2$ lattice.

In comparison, a purple powder was obtained on firing an identical sample in air, with colour coordinates; L=25.96, a=7.86, b=−14.10, C=16.14 and H=299.16. This sample contained 1.24% Ag in the $ZrO_2$ lattice.

EXAMPLE 62

Hydrogen/Nitrogen firing

The preparative route for an Ag—$ZrO_2$ pigmentary material starting with nominally 10 wt % Ag with respect to $ZrO_2$ equivalent is provided.

1. 56.34 g of zirconyl hydroxide (71.00% $ZrO_2$) was ball milled for 4 hours with 6.30 g of $AgNO_3$ and 45 ml of acetone, in a 1 pint (0.57 liter) ball mill.
2. The acetone was evaporated off, and the powder dry mixed in a mortar and pestle for 10–15 minutes.
3. 20.10 g of this powder was fired at 860° C. for 1 hour in a dynamic atmosphere of 10%$H_2$/90%$N_2$ by volume, with a ramp rate of 6.7° C./minute from room temperature, and then furnace cooled in the $H_2/N_2$ atmosphere. The sample was acid washed a described in Example 1. A brown powder was obtained, with colour coordinates; L=26.31, a=8.64, b=5.80, C=10.41 and H=33.90. Chemical analysis of the material identified 5.56% Ag contained in the $ZrO_2$ lattice.

In comparison, a strong pinkish purple powder was obtained on firing an identical sample in air, with colour coordinates; L=28.35, a=12.67, b=−14.95, C=19.59 and H=310.28. This sample contained 2.22% Ag in the $ZrO_2$ lattice.

EXAMPLES 63–67
Admixtures With Other Pigmentary Materials

The colour range of the Ag—$ZrO_2$ pigmentary materials can be extended by the addition of other pigmentary materials. Examples are provided in Table 8 below, together with the corresponding colour coordinates obtained in on-glaze application on china. The base colours (other pigmentary materials) were admixed in the percentages quoted.

TABLE 8

Addition of Base Colours

| Example number | Ag-$ZrO_2$ preparative route and % employed | Additional base colour and % employed | China On-Glaze Colour Coordinates | | | | |
|---|---|---|---|---|---|---|---|
| | | | L | a | b | C | H |
| 63 | Example 2 85.5% | $CoAl_2O_4$, (Johnson Matthey 94L1000) 14.5% | 43.05 | 26.97 | −9.69 | 28.65 | 340.23 |
| 64 | Example 2 85.5% | V/$ZrO_2$ (Johnson Matthey 14H365) 14.5% | 43.16 | 26.16 | −3.44 | 26.39 | 352.51 |
| 65 | Example 2 85.5% | $BiVO_4$ (BASF L1110) 14.5% | 44.82 | 24.90 | −1.51 | 24.95 | 356.53 |
| 66 | Example 2 66.6% | $TiO_2$ 33.3% | 50.71 | 23.72 | −8.54 | 25.21 | 340.20 |
| 67 | Example 2 50.0% | Colloidal gold based colour (Johnson Matthey 94A1003) 50.0% | 35.21 | 25.62 | 4.39 | 25.99 | 9.72 |

EXAMPLES 68–77
Doped Silver Zirconia Pigmentary Materials

EXAMPLE 68

The preparative route for the production of an Ag—$ZrO_2$ pigmentary material containing Sn dopant is provided.

1. A tin oxide hydrate was precipitated by acidifying a sodium stannate solution with acetic acid. The material was filtered, washed with distilled water and dried in an oven overnight at 100° C.
2. 56.111 g of zirconyl hydroxide (71.29% $ZrO_2$), 2.52 g of Ag nitrate and 4.01 g of the tin oxide hydrate described above in point 1 were hand ground with acetone in an agate mortar and pestle, for 30 minutes.
3. The acetone was evaporated off.
4. The powder was then fired and acid washed as described in Example 1. A strong pinkish purple powder was obtained with colour coordinates; L=42.17, a=17.35, b=−6.00, C=18.36 and H=340.91. Chemical analysis of the washed powder indicated that it contained 0.6 wt % Ag and 5.5 wt % Sn (equivalent to 6.99 wt % $SnO_2$). This sample produced a salmon pink colour for on-glaze application on china with colour coordinates: L=60.71, a=26.68, b=11.03, C=28.87 and H=22.47.

EXAMPLE 69

The preparative route for the production of an Ag—$ZrO_2$ pigmentary material containing Sn dopant is provided.

1. 56.111 g of zirconyl hydroxide (71.29% $ZrO_2$), 2.52 g of Ag nitrate and 1.41 g of the tin oxide hydrate described above in point 1 of Example 68 were hand ground with acetone in an agate mortar and pestle, for 30 minutes.
2. The acetone was evaporated off.
3. The powder was then fired and acid washed as described in Example 1. A strong pinkish purple powder was obtained with colour coordinates; L=50.15, a=17.06, b=−21.19, C=27.21 and H=308.83. Chemical analysis of the washed powder indicated that it contained 0.77 wt % Ag and 1.34 wt % Sn (equivalent to 1.7 wt % $SnO_2$). This sample produced a reddish pink colour for on-glaze application on china with colour coordinates: L=50.79, a=30.97, b=5.41, C=31.44 and H=9.92.

EXAMPLE 70

The preparative route for the production of an Ag—$ZrO_2$ pigmentary material containing Ce dopant is provided.

1. A cerium oxide hydrate was precipitated by the addition of a sodium hydroxide solution to a solution of cerium nitrate hexahydrate. The resultant pale brown precipitate was filtered, washed with distilled water and dried in an oven for 20 hours at 100° C. The pale yellow solid was ground to a fine powder in an agate mortar and pestle.
2. 21.043 g of zirconyl hydroxide (71.29% $ZrO_2$), 0.946 g of Ag nitrate and 3.002 g of the cerium oxide hydrate described above in point 1 were hand ground with acetone in an agate mortar and pestle, for 30 minutes.
3. The acetone was evaporated off.
4. The powder was then fired and acid washed as described in Example 1. A strong pinkish purple powder was obtained with colour coordinates; L=50.58, a=21.15, b=−13.54, C=25.11 and H=327.38. Chemical analysis of the washed powder indicated that it contained 0.7 wt % Ag and 10.1 wt % Ce (equivalent to 12.40 wt % $CeO_2$). This sample produced a reddish pink colour for on-glaze application on china with colour coordinates: L=52.77, a=30.17, b=7.41, C=31.07 and H=13.80.

EXAMPLE 71

The preparative route for the production of an Ag—$ZrO_2$ pigmentary material containing Ce dopant is provided.

1. 21.044 g of zirconyl hydroxide (71.29% $ZrO_2$), 0.946 g of Ag nitrate and 4.99 g of the cerium oxide hydrate described above in point 1 of Example 70 were hand ground with acetone in an agate mortar and pestle, for 30 minutes.
2. The acetone was evaporated off.
3. The powder was then fired and acid washed as described in Example 1. A strong pinkish purple powder was obtained with colour coordinates; L=53.44, a=4.61, b=−8.89, C=10.02 and H=297.42. Chemical analysis of the washed powder indicated that it contained 0.2 wt % Ag and 13.0 wt % Ce (equivalent to 15.99 wt % $CeO_2$). This sample produced a grey lilac colour for on-glaze application on china with colour coordinates; L=67.78, a=8.19, b=−0.12, C=8.19 and H=359.15.

EXAMPLE 72

The preparative route for the production of an Ag—$ZrO_2$ pigmentary material containing Ce dopant is provided.
1. 21.042 g of zirconyl hydroxide (71.29% $ZrO_2$), 0.945 g of Ag nitrate and 0.751 g of the cerium oxide hydrate described above in point 1 of Example 70 were hand ground with acetone in an agate mortar and pestle, for 30 minutes.
2. The acetone was evaporated off.
3. The powder was then fired and acid washed as described in Example 1. A strong purple colour powder was obtained with colour coordinates; L=29.61, a=12.66, b=−12.74, C=17.97 and H=314.82. Chemical analysis of the washed powder indicated that it contained 1.1 wt % Ag and 3.1 wt % Ce (equivalent to 3.81 wt % $CeO_2$).

EXAMPLE 73

The preparative route for the production of an Ag—$ZrO_2$ pigmentary material containing Mg dopant is provided.
1. 21.042 g of zirconyl hydroxide (71.29% $ZrO_2$), 0.945 g of Ag nitrate and 1.440 g $Mg(OH)_2$ (from BDH.UK) were hand ground with acetone in an agate mortar and pestle, for 30 minutes.
2 The acetone was evaporated off.
3. The powder was then fired and acid washed as described in Example 1. A pinkish purple powder was obtained with colour coordinates; L=37.93, a=17.40, b=−14.13, C=22.41 and H=320.92. Chemical analysis of the washed powder indicated that it contained 0.50 wt % Ag and 0.86 wt % Mg (equivalent to 1.43 wt % MgO). This sample produced a peach pink colour for on-glaze application on china with colour coordinates; L=71.46, a=19.00, b=15.58, C=24.57 and H=39.35.

EXAMPLE 74

The preparative route for the production of an Ag—$ZrO_2$ pigmentary material containing Al dopant is provided.
1. An aluminium oxide hydrate was precipitated by the addition of a solution of aluminium tri sec-butoxide in propan-2-ol to water. The resultant white precipitate was filtered, washed with distilled water and dried in an oven for 20 hours at 100° C. The white solid was ground to a fine powder in an agate mortar and pestle.
2. 56.112 g of zirconyl hydroxide (71.29% $ZrO_2$), 2.521 g of Ag nitrate and 7.998 g of the aluminium oxide hydrate described above in point 1 were hand ground with acetone in an agate mortar and pestle, for 30 minutes.
3. The acetone was evaporated off.
4. The powder was then fired and acid washed as described in Example 1. A strong dark purple powder with a blue tinge was obtained with colour coordinates; L=28.56, a=6.94, b=−13.81, C=15.46 and H=296.67. Chemical analysis of the washed powder indicated that it contained 3.6 wt % Ag and 1.4 wt % Al (equivalent to 2.66 wt % $Al_2O_3$). This sample produced a purple pink colour for on-glaze application on china with colour coordinates; L=48.20, a=28.72, b=−5.55, C=29.25 and H=349.07.

EXAMPLE 75

The preparative route for the production of an Ag—$ZrO_2$ pigmentary material containing Sr dopant is provided.
1. 18.841 g of zirconyl hydroxide (71.29% $ZrO_2$), 0.945 g of Ag nitrate and 2.137 g of $SrCO_3$ (from BDH, UK) were hand ground with acetone in an agate mortar and pestle, for 15 minutes.
2. The acetone was evaporated off.
3. The powder was then fired and acid washed as described in Example 1. A very strong dark purple powder was obtained with colour coordinates; L=19.94, a=9.26, b=−6.82, C=11.49 and H=323.63. This sample produced a reddish purple colour for on-glaze application on china with colour coordinates; L=43.62, a=25.26, b=2.34, C=25.37 and H=5.30.

EXAMPLE 76

The preparative route for the production of an Ag—$ZrO_2$ pigmentary material containing Sr dopant is provided.
1. 20.097 g of zirconyl hydroxide (71.29% $ZrO_2$), 0.945 g of Ag nitrate and 0.8548 g of $SrCO_3$ (from BDH, UK) were hand ground with acetone in an agate mortar and pestle, for 15 minutes.
2. The acetone was evaporated off.
3. The powder was then fired and acid washed as described in Example 1. A very strong dark purple powder was obtained with colour coordinates; L=20.44, a=10.49, b=−9.04, C=13.85 and H=319.24. This sample produced a reddish purple colour for on-glaze application on china with colour coordinates; L=42.66, a=26.03, b=1.11, C=26.05 and H=2.44.

EXAMPLE 77

The preparative route for the production of an Ag—$ZrO_2$ pigmentary material containing Y dopant is provided.
1. 18.841 g of zirconyl hydroxide (71.29% $ZrO_2$), 0.945 g of Ag nitrate and 3.812 g of $Y_2(CO_3)_3$ (from BDH, UK) were hand ground with acetone in an agate mortar and pestle, for 15 minutes.
2. The acetone was evaporated off.
3. The powder was then fired and acid washed as described in Example 1. A dark purple powder with a blue tinge was obtained with colour coordinates; L=21.94, a=6.77, b=−13.51, C=15.11 and H=296.62.

EXAMPLES 78–81

Pigment Uses

The present pigmentary material can be used for a wide range of pigmentary and ceramic systems including on-glaze, in-glaze, under-glaze, glass, plastic, dispersion, jewellery, tile and sanitary ware coloration and related applications. The material can be used also as a colorant in four colour printers.

The wide colour range possessed by the present material can be extended using various coated, doped or surface treated frit systems. Colour changes can also be produced by sintering the enamels prior to application.

EXAMPLE 78

On-glaze Application

A wide range of pale pink through to strong purple colours was obtained for on-glaze application on china and porcelain. A range of pinkish peach through to peach colours was also prepared. Colour coordinate data are provided in the Examples above. The following experimental procedure was employed:

1. An enamel composition was prepared by ball milling 10 g of the present pigmentary material with 40 g of a frit (Johnson Matthey 2C186) and 20 ml of water, in a 1 pint (0.57 liter) ball mill, for ca 16 hours until an average particle size of 4.5 µm was achieved.
2. The resulting slurry was dried at 100° C., and sieved through a 40 mesh followed by a 200 mesh sieve.
3. An ink was prepared by thoroughly mixing 20 g of the resultant enamel composition with 16 g of transfer medium (Johnson Matthey 63/535).
4. Transfers were then prepared using a 90T or a 120T screen. The dried prints were subsequently overprinted with a covercoat composition (Johnson Matthey OPL 164) using a 25 mesh screen, and allowed to dry.
5. The printed decals were then applied to the ware, eg china, porcelain or earthenware.
6. The china was fired at 780° C. for 1 hour, with a ramp rate of 150° C./hour, and the porcelain was fired at the higher temperature of 810° C. for 1 hour with the same ramp rate. The earthenware was fired at 740° C. for 1 hour, with a ramp rate of 150° C./hour. The ware was allowed to cool in the furnace to room temperature.

EXAMPLE 79

In-glaze Application

A wide range of pale pink to strong purple colours was obtained for in-glaze application on porcelain. The experimental procedure employed was as follows:

1. 25 g of a frit (Johnson Matthey 2C174) was ball milled in water, to an average particle size of 4.5 µm.
2. The resultant slurry was dried at 100° C., and sieved through a 40 mesh sieve.
3. 50 g quantities of enamel composition were prepared by dry blending the pre-ground frit and the present pigmentary material in the weight ratios of 4:1 and 1:1, in a high speed disperser.
4. The blended enamel compositions were then sieved through a 200 mesh sieve.
5. 20 g of the enamel composition was thoroughly mixed with 16 g of medium (Johnson Matthey 63/535) to form a homogeneous paste, or ink.
6. The ink was then screen printed, dried and covercoated (Johnson Matthey covercoat composition OPL164) to prepare transfers. Once dry, the transfers were applied to the porcelain ware.
7. A typical firing cycle of 1200° C. for 2 minutes was employed, with a ramp rate of 40° C./minute from room temperature. The ware was cooled at approximately the same rate, of 40° C./min.

EXAMPLE 80

Use on Glass

Wide ranges of pinkish purple through to grape/purple and reddish pink to burgundy/purple colours were obtained on glass. The experimental procedure employed was as follows:

1. An enamel composition was prepared by ball milling 10 g of the present pigmentary material with 40 g of a frit (Johnson Matthey 2C28) and 20 ml of water in a 1 pint (0.57 liter) ball mill, for ca 16 hours until an average particle size of 4.5 µm was achieved.
2. The resulting slurry was dried at 100° C., and then sieved through a 40 mesh followed by a 200 mesh sieve.
3. An ink was prepared by thoroughly mixing 40 g of the resultant enamel composition with 13.33 g of medium (Johnson Matthey 63/485).
4. The ink was then screen printed directly onto the non-tin side of a glass slide (the side of the float glass which was not in contact with the molten tin during manufacture).
5. The glass slides were fired at 580° C. for 15 minutes, with a ramp rate of 580° C./hour from room temperature, and furnace cooled.

Examples follow using a particular pigmentary material:

Pigment Preparation

Ag/ZrO$_2$ pigmentary material was prepared starting with nominally 7 wt % Ag with respect to ZrO$_2$ equivalent. 80 kg of zirconyl hydroxide was ground in a vibro mill with 4.2 kg of Ag$_2$O for 6.5 hours to obtain an average particle size of 1.9 µm. The mixture was dried at 80° C., ground, and then fired at 860° C. for 4 hours, with a ramp rate of 6.67° C./minute. The sample was furnace cooled to room temperature (the furnace vents were left open to 600° C.). It was then acid washed, dried and ground. The pigmentary material was then applied to glass using a leaded and an unleaded flux as described below in Examples 80A to 80C, in order to illustrate the colours produced.

EXAMPLE 80A

Leaded Flux

An Example is provided using Johnson Matthey 42 series leaded flux. Enamels prepared with this type of flux are typically used to colour glass for cosmetic containers and drinking glasses.

1. An enamel was prepared by ball milling 5 g of the pigmentary material with 45 g of leaded frit (Johnson Matthey 2C28) and 20 ml of water in a 1 pint (0.57 liter) ball mill, for ca 16 hours until an average particle size of 4.5 µm was achieved.
2. The resultant slurry was dried at 100° C. and then sieved through a 40 mesh followed by a 200 mesh sieve.
3. An ink was prepared by thoroughly mixing 40 g of the resultant enamel composition with 13.33 g of medium (Johnson Matthey 63/485).
4. The ink was then screen printed directly onto the non-tin side of a glass slide, through a 61T screen.
5. The glass slide was fired at 580° C. for 15 minutes, with a ramp rate of 580° C./hour from room temperature, and furnace cooled. A strong red-pink colour was obtained, with colour coordinates; L=47.43, a=28.27, b=7.88, C=29.35 and H=15.58.

EXAMPLE 80B

Leaded Flux

An Example is provided using the Johnson Matthey 44 series leaded flux. Enamels prepared with this type of flux are typically used to colour permanent labels for returnable beer and soft drink glass bottles.

1. An enamel was prepared as outlined in Example 80A, but in this case using 45 g of Johnson Matthey leaded flux 2C84.
2. An ink was prepared and printed onto glass slides as described in Example 80A.
3. The glass slides were then fired at 610° C. for 15 minutes, with a ramp rate of 610° C./hour from room temperature, and furnace cooled. A strong cerise-pink colour was produced, with colour coordinates; L=41.69, a=21.04, b=−1.11, C=21.06 and H=356.97.

EXAMPLE 80C

Unleaded Flux

An Example is provided using the Johnson Matthey 45 series unleaded flux. Enamels prepared with this type of flux are typically used to colour toughened glass.

1. An enamel was prepared by ball milling 5 g of the pigmentary material with a mixture of two types of unleaded frit: 6.75 g of Johnson Matthey 2C191 and 38.25 g of Johnson Matthey 2C190 in a 1 pint (0.57 liter) ball mill. 20 ml of water was added and the mixture ball milled for ca 16 hours until an average particle size of 4.5 µm was achieved.
2. The resultant slurry was dried at 100° C., and then sieved through a 40 mesh followed by a 200 mesh sieve.
3. An ink was prepared by thoroughly mixing 40 g of the resultant enamel composition with 20 g of medium (Johnson Matthey 63/485).
4. The ink was then screen printed directly onto the non-tin side of a glass slide, through a 61T screen.
5. A rapid firing cycle was employed with the glass slide fired at 720° C. for 5 minutes. The glass was inserted and removed from the furnace at 720° C. A strong rose-pink colour was produced, with colour coordinates; L=43.61, a=24.53, b=7.64, C=25.69 and H=17.30.

EXAMPLE 81

Use on Tableware Glass

A wide range of pale pink to strong purple colours was obtained on applying the present pigmentary materials to tableware glass. The following experimental procedure was employed:

1. An enamel composition was prepared by ball milling 10 g of the present pigmentary material with 40 g of a frit (Johnson Matthey 2C51) and 16 ml of water in a 1 pint (0.57 liter) ball mill, for ca 16 hours until an average particle size of 4.5 µm was achieved.
2. The resulting slurry was dried at 100° C., and then sieved through a 40 mesh followed by a 200 mesh sieve.
3. An ink was prepared by thoroughly mixing 10 g of the resultant enamel composition with 6 g of transfer medium (Johnson Matthey 63/535).
4. Transfer decals were then prepared using a 120T screen. The dried prints were subsequently over-printed with a covercoat composition (Johnson Matthey OPL164) using a 25 mesh screen, and allowed to dry.
5. The printed decals were then applied to the tableware glass substrate.
6. A typical firing cycle of 720° C. for 2½ minutes was employed, with a ramp rate of 70° C./minute from room temperature.

EXAMPLE 82

Admixture With a Plurality of Other Pigmentary Materials

A homogeneous mixture with a plurality of coloured enamels was obtained by dry blending the powder in a high speed disperser:

1. The Ag—$ZrO_2$ pigmentary material was prepared as described in Example 22, Method B.
2. The Ag—$ZrO_2$ enamel was prepared by ball milling 13.33 g of Ag—$ZrO_2$ with a mixture of two types of frit; 30 g of Johnson Matthey 2C157 and 10 g of Johnson Matthey 2C122, in a 1 pint (0.57 liter) ball mill. 21 ml of water was then added and the mixture ball milled for 16 hours until an average particle size of 4.5 µm was achieved. The resulting slurry was dried at 100° C., and sieved through a 40 mesh followed by a 200 mesh sieve.
3. 20 g of the Ag—$ZrO_2$ enamel was then mixed with 2.5 g of a mixing flux (Johnson Matthey 93C1000), 2.5 g of a colloidal gold-based enamel (Johnson Matthey 93A1002) and 25 g of a $Co_2SiO_4$ enamel (Johnson Matthey 93L1001). A homogeneous mix was obtained by dry blending the enamels in a high speed disperser. The mixed enamel was then processed as described in Example 78. The transfer decals were printed through a 120T screen. A strong pinkish purple colour was obtained in on-glaze application on china, with colour coordinates; L=41.05, a=17.66, b=−14.25, C=22.69 and H=321.10.

EXAMPLE 83

1. 2.4 g $AgNO_3$, 28.082 g zirconyl hydroxide (71.22% $ZrO_2$) and 0.4 g starch were hand ground with acetone in an agate mortar and pestle.
2. The acetone was evaporated off.
3. The dry mix was then spread out in a thin layer 2.5–3.0 mm thick in a muffle tray and calcined at 1000° C. for 2 hours, with a ramp rate of 6.67° C./minute from room temperature. The sample was furnace cooled. A strong grey pinkish purple powder was obtained with a very thin pinker base layer and edges. The powder was mixed to produce a strong grey pinkish purple sample with colour coordinates; L=32.70, a=8.43, b=−10.79, C=13.69 and H=308.02.
4. A portion of the fired product was acid washed as described in Example 1. A cleaner, strong pinkish purple sample was produced with colour coordinates; L=33.41, a=14.10, b=−15.20, C=20.73 and H=312.86. Chemical analysis of the material identified 0.58% Ag, contained within the $ZrO_2$ lattice. The powder produced a pinkish purple colour in on-glaze application on china (printed through a 120T screen), with colour coordinates; L=54.21, a=21.03, b=−3.30, C=21.29 and H=351.09.

EXAMPLE 84

The product was prepared as described in Example 83 except that no starch was employed. A similar strong grey pinkish purple sample was obtained with colour coordinates; L=31.04, a=6.69, b=−10.89, C=12.78 and H=301.54.

A portion of the fired product was acid washed as described in Example 1. A cleaner, strong pinkish purple sample was produced with colour coordinates; L=34.18, a=13.65, b=−16.09, C=21.10 and H=310.32. Chemical analysis of the washed material identified 0.57% Ag, contained within the $ZrO_2$ lattice. The powder produced a pinkish purple colour in on-glaze application on china (printed through a 120T screen) with colour coordinates; L=51.83, a=25.01, b=−4.32, C=25.38 and H=350.21.

Comparative Example 1

A comparison was conducted with Examples 83 and 84 by employing fluoride in addition.

1. 2.4 g $AgNO_3$, 28.082 g zirconyl hydroxide (71.22% $ZrO_2$), 0.4 g starch and 16.0 g $NH_4HF_2$ were hand ground with acetone in a porcelain mortar and pestle for 30 minutes. A yellow mixture resulted. The yellow coloration is thought to be due to the production of AgF.
2. The dry mix was then spread out in a thin layer about 3 mm thick in a muffle tray and fired as described in Example 83. A layered sample was obtained with a pale greyish pink surface layer, of ca 1 mm, a pale pink mid layer, of ca 1 mm, and a very thin pinkish base layer. The powder was mixed to produce a pale greyish pink powder with colour coordinates; L=68.60, a=11.01, b=−3.96, C=11.70 and H=340.23.
3. A proportion of the sample was acid washed as described in Example 1. A cleaner pale greyish pink powder was produced with colour coordinates: L=70.65, a=12.39, b=−5.70, C=13.64 and H=335.30. Chemical analysis of the washed material identified 0.12% Ag, contained within the $ZrO_2$ lattice. The powder produced a very pale pink colour in on-glaze application on china (printed through a 120T screen), with colour coordinates: L=80.63, a=7.13, b=0.71, C=7.17 and H=5.70.

It can be seen by comparison with Examples 83 and 84 that a considerably darker and stronger powder and china on-glaze colour is produced by the material and process of the invention, avoiding fluoride, with a higher percentage of Ag being obtained in the lattice, as revealed by analysis after acid washing. Thus, the presence of fluoride is detrimental to colour formation.

It should be noted that stronger colours can be produced by the procedure of Examples 83 and 84 but with a lower calcination temperature of ca 860° C., a 1 hour soak and the sample removed from the furnace at the calcination temperature. The firing temperature and time and the cooling conditions in Example 83 were chosen, however, in view of U.S. Pat. No. 3,046,151.

Comparative Examples 2–14

Work has been done trying to follow and improve the Examples in U.S. Pat. No. 3,046,151, which however, do not specify some features. In addition, Example H in its Table seems to be the same as its Example 1.

In each Comparative Example, the reaction mixture was heated up to the calcination temperature at a ramp rate of 6.67° C./minute from room temperature, and after calcination allowed to cool in the furnace—the US specification is silent about these features. The zirconia employed was obtained from Fisons (reference number Z/1850).

Comparative Example 2

Following Example 4 of the US specification:
1. 0.4 g (2 parts) of Ag powder, 16.0 g (80 parts) of $NH_4HF_2$, 20.0 g (100 parts) of $ZrO_2$ and 0.4 g (2 parts) of oxalic acid were hand ground with acetone in a porcelain mortar and pestle for 30 minutes.
2. The acetone was evaporated off.
3. The dry mix was placed in a tall $Al_2O_3$ crucible, with a powder depth of ca 30 mm. 8 mm of distilled water was then added to produce a damp mixture.
4. The sample was calcined at 1000° C. for 5 hours, with a ramp rate of 6.67° C./minute from room temperature, and furnace cooled. The fired material displayed a very thin purple/grey surface layer, of ca 1 mm, with the bulk of the material found to be cream/white in colour. Rings of pink coloration was observed round the sides of the crucible with a grey ring noted round the rim of the crucible. The fired sample was mixed to produce a homogeneous cream/white sample, whose powder colour coordinates and percent Ag content are given in Table 9 which follows. The F content of the material was found to be 7.8%. Degradation of the alumina crucible was noted. The material was acid washed as described in the present Example 1 (though the US specification makes no mention of acid washing), and the powder colour coordinates and percent Ag content measured again; the results are given in Table 9.

It is a great disadvantage that non-cream/white colour is formed only in a thin layer. The US specification makes no mention of this problem. To at least avoid the cream/white bulk, the remainder of these Comparative Examples, Comparative Examples 3–14, were conducted employing only a thin layer in a muffle tray for the firing.

Comparative Example 3

Based on Example 4 of the US specification:

The dry reaction mix was prepared as described above in Comparative Example 2. The powder was then spread out in a layer about 3.5 mm thick in an aluminosilicate muffle tray of length 120 mm, width 89 mm and depth 12 mm. The mixture was dampened with 8 ml of distilled water. The sample was then calcined as described in Comparative Example 2. A pale pinkish purple material was obtained. Degradation of the muffle tray was noted. Data on the material before and after acid washing as described in the present Example 1 are given in Table 9. Colour coordinates of the washed material were measured in on-glaze application on china, screen printed through a 120T screen. A very pale pink coloration was obtained. Its colour coordinates are given in Table 9.

It can be seen that only a small amount of Ag remained in the sample after washing in Comparative Examples 2 and 3. The bulk of the Ag in the material as fired is accordingly free, uncombined, Ag.

Comparative Example 4

Based on Example 1 of the US specification:
1. 0.857 g (4 parts) of $AgNO_3$ was dissolved in 1 g of distilled water and was added to 15.000 g (70 parts) of $ZrO_2$, 12.857 g (60 parts) of $ZrF_4.H_2O$ and 0.857 g (4 parts) of starch in a porcelain mortar and pestle. Two washings of the $AgNO_3$ container were added, making it up to a total of 1.7 g (8 parts) of water added. The constituents were then ground for ca 30 minutes until the bulk of the water had evaporated and a homogeneous damp mix was obtained.
2. The sample was then spread out in a thin layer of ca 1 mm thickness in the muffle tray and fired at 900° C. for 2 hours. A pale greyish pink sample was obtained, with a paler surface layer. The powder was mixed to produce a homogeneous pale greyish pink sample, whose colour coordinates are given in Table 9.
3. A portion of the fired material was acid washed as described in Example 1. A cleaner pale greyish pink sample was obtained, whose colour coordinates and Ag content are also given in Table 9.

Comparative Example 5

Based on Example 2 of the US specification:

The method of Comparative Example 4 was followed except that no starch was added. A mottled pale grey/pink was obtained on firing the material. The sample was mixed to produce a homogeneous pale pink/grey colour (paler than that of Comparative Example 4) whose colour coordinates are given in Table 9.

A portion of the fired material was acid washed as described in Example 1. A cleaner pale grey/pink material was obtained, whose colour coordinates and Ag content are also given in Table 9.

Comparative Example 6

Based on Example 3 of the US specification:
1. 0.606 g (3.029 parts) of a silver resinate compound (21% Ag) was mixed with 20.00 g (100 parts) of $ZrO_2$, 16.00 g (80 parts) of $NH_4HF_2$ and 1.6 g (8 parts) of starch in a porcelain mortar and pestle. A small amount of diethyl ether was added to aid the mixing process.
2. A sample was spread out in a layer of 3–4 mm in the muffle tray, sufficient diethyl ether was then added to produce a damp mix. Some of the Ag solution was found to seep through the muffle tray.
3. The material was then fired at 1000° C. for 2 hours. A pale purplish pink sample was obtained with a paler pink surface layer. The material was mixed to produce a homogeneous pale purplish pink powder, whose colour coordinates are given in Table 9.
4. A portion of the material was acid washed as described in Example 1. A cleaner pale purplish pink sample was obtained, whose colour coordinates and Ag content are given in Table 9. The powder produced a pale pink colour in on-glaze application on china, screen printed through a 120T screen. Its colour coordinates are also given in Table 9.

Comparative Example 7

Based on Example A of the US specification:
1. 0.8 g (4 parts) of $AgNO_3$ was dissolved in ca 1 g of distilled water and added to 16.0 g (80 parts) of $NH_4HF_2$ and 20.0 g (100 parts) of $ZrO_2$ in a porcelain mortar and pestle, along with two washings. The constituents were ground until the bulk of the water had evaporated off to produce a homogeneous damp mix (ca 30 minutes).
2. The mixture was then spread out in a thin layer, of 2–3 mm thickness, in the muffle tray and calcined at 900° C. for 2 hours. A purplish pink sample was obtained with a slightly darker surface layer. The powder was mixed to produce a purplish pink sample, whose colour coordinates are given in Table 9.
3. A portion of the sample was acid washed as described in Example 1. A cleaner purplish pink material was obtained, whose colour coordinates and Ag content are given in Table 9.

Comparative Example 8

Based on Example B of the US specification:
1. The reaction mixture was prepared as described in Comparative Example 7 except that 0.4 g (2 parts) of starch was also added.
2. The damp mix was then spread out in a thin layer of 2–3 mm in the muffle tray and fired at 700° C. for 2 hours. A brownish/pink sample was obtained with a darker surface layer. The powder was mixed to produce a brownish pink sample, whose colour coordinates are given in Table 9.
3. A portion of the material was acid washed as described in Example 1. A cleaner brownish pink sample was obtained, whose colour coordinates and Ag content are given in Table 9.

Comparative Example 9

Based on Example C of the US specification:
1. The reaction mixture was prepared as described in Comparative Example 7 except that 4.0 g (20 parts) of starch was also added.
2. The damp mix was then spread out in a thin layer of ca 2 mm thickness in the muffle tray and fired at 1000° C. for 2 hours. A pale pink sample was obtained with a darker surface layer. The powder was mixed to produce a pale pink sample, whose colour coordinates are given in Table 9.
3. A portion of the material was acid washed as described in Example 1. A cleaner pale pink powder was produced, whose colour coordinates and Ag content are given in Table 9. The powder produced a very pale pink colour in on-glaze application on china, screen printed through a 120T screen. Its colour coordinates are also given in Table 9.

Comparative Example 10

Based on Example D of the US specification:
1. 0.8 g (4 parts) of $AgNO_3$ was dissolved in ca 1 g of distilled water and added to 8.0 g (40 parts) of $NH_4HF_2$, 20.0 g (100 parts) of $ZrO_2$ and 0.4 g (2 parts) of urea in a porcelain mortar and pestle, along with two washings. The mixture was ground until the bulk of the water had evaporated off to produce a homogeneous damp mix (ca 30 minutes).
2. The mixture was spread out in a thin layer of ca 1.5 mm in the muffle tray and fired at 1000° C. for 2 hours. A pale grey/pink sample was produced whose colour coordinates are given in Table 9.
3. A portion of the fired material was acid washed as described in Example 1. A cleaner pale grey/pink material was obtained, whose colour coordinates and Ag content are given in Table 9.

Comparative Example 11

Based on Example E of the US specification:
1. 0.8 g (4 parts) of $AgNO_3$ was dissolved in ca 1.1 g of distilled water and added to 24.0 g (120 parts) of $NH_4HF_2$ and 20.0 g (100 parts) of $ZrO_2$ and 0.4 g (2 parts) of polyvinyl alcohol (PVA) in a porcelain mortar and pestle, along with two washings. The mixture was ground until the bulk of the water had evaporated off to produce a homogeneous damp mix (ca 30 minutes).
2. The damp mixture was then spread out in a thin layer of 2–3 mm in the muffle tray and fired at 1000° C. for 2 hours. A pinkish purple sample was obtained, whose colour coordinates are given in Table 9.
3. A portion of the fired material was acid washed as described in Example 1. A cleaner pinkish purple powder was produced, whose colour coordinates and Ag content are given in Table 9.

Comparative Example 12

Based on Example F of the US specification:
1. 0.4 g (2 parts) of Ag powder, 16.0 g (80 parts) of $NH_4HF_2$, 20 g (100 parts) $ZrO_2$ and 0.4 g (2 parts) of starch were ground with acetone in a porcelain mortar and pestle for 30 minutes.
2. The acetone was evaporated off.
3. The dry powder was spread out in a thin layer of 2–2.5 mm thickness in the muffle tray. 8–10 ml of distilled water were then added to produce a damp mix.
4. The sample was fired at 1100° C. for 5 hours. A purple powder was obtained, whose colour coordinates are given in Table 9.

5. A portion of the sample was acid washed as described in Example 1. A cleaner purple powder was produced, whose colour coordinates and Ag content are given in Table 9. The sample produced a very pale pinkish purple colour in on-glaze application on china, screen printed through a 120T screen. Its colour coordinates are also given in Table 9.

Comparative Example 13

Based on Example G of the US specification:

1. 0.4 g (2 parts) of $Ag_2CO_3$, 16.0 g (80 parts) $NH_4HF_2$, 20.0 g (100 parts) of $ZrO_2$ and 0.4 g (2 parts) of starch were hand ground with acetone in a porcelain mortar and pestle.
2. The acetone was evaporated off.
3. The dry powder was then spread out in a thin layer of 2-3 mm thickness in the muffle tray. 8-10 ml of distilled water were then added to produce a damp mix.
4. The sample was then fired at 1000° C. for 3 hours. A pinkish purple powder was obtained, whose colour coordinates are given in Table 9.
5. A portion of the sample was acid washed as described in Example 1.

A cleaner pinkish purple colour was obtained, whose colour coordinates and Ag content are given in Table 9. The powder produced a very pale purplish pink colour in on-glaze application on china, screen printed through a 120T screen. Its colour coordinates are also given in Table 9.

Comparative Example 14

Based on Example I of the US specification:

1. 2.4 g (12 parts) of $AgNO_3$ was dissolved in ca 5 g of distilled water and added to 16.0 g (80 parts) of $NH_4HF_2$, 20.0 g (100 parts) of $ZrO_2$ and 0.4 g (2 parts) of starch in a porcelain mortar and pestle, along with two washings. The mixture was ground until the bulk of the water had evaporated off to produce a homogeneous damp mix (ca 1 hour).
2. The mixture was then spread out in a thin layer of ca 2 mm in the muffle tray and calcined at 1000° C. for 2 hours. A pinkish purple sample was obtained with a slightly darker surface layer and a greyer base layer. The powder was mixed to produce a homogeneous pinkish purple colour, whose colour coordinates and Ag content are given in Table 9. The fired material should consist of $Ag/ZrO_2$ with 7.08% Ag; 3.99% was found. About half of the Ag would therefore appear to be evolved on firing the material.
3. A portion of the sample was acid washed as described in Example 1. A cleaner pinkish purple powder was obtained, whose colour coordinates and Ag content are given in Table 9. The sample produced a very pale purplish pink colour in on-glaze application on china, screen printed through a 120T screen. Its colour coordinates are also given in Table 9.

TABLE 9

| Comparative Example | Related Example of US 3046151 | Fired in | % Ag Before Washing | Powder Colour Coordinates Before Washing | | | | | Powder Colour Coordinates After Washing | | | | |
|---|---|---|---|---|---|---|---|---|---|---|---|---|---|
| | | | | L | a | b | C | H | L | a | b | C | H |
| 2 | 4 | Crucible | 1.49 | 85.77 | 1.60 | 4.00 | 4.30 | 68.20 | 88.80 | 1.22 | 3.10 | 3.33 | 68.58 |
| 3 | 4 | Tray | 1.09 | 53.52 | 15.70 | −5.59 | 16.67 | 340.41 | 54.29 | 16.34 | −6.31 | 17.52 | 338.89 |
| 4 | 1 | Tray | | 59.68 | 13.43 | −0.86 | 13.46 | 356.35 | 62.47 | 13.85 | −1.80 | 13.97 | 352.58 |
| 5 | 2 | Tray | | 62.21 | 9.90 | 0.35 | 9.91 | 2.03 | 64.78 | 10.24 | −0.62 | 10.26 | 356.52 |
| 6 | 3 | Tray | | 59.34 | 14.91 | −3.82 | 15.39 | 345.62 | 57.39 | 15.96 | −3.89 | 16.43 | 346.30 |
| 7 | A | Tray | | 51.23 | 17.75 | −4.31 | 18.27 | 346.37 | 54.66 | 16.80 | −4.22 | 17.32 | 345.89 |
| 8 | B | Tray | | 46.08 | 17.32 | 3.35 | 17.64 | 10.93 | 46.78 | 17.53 | 2.91 | 17.76 | 9.42 |
| 9 | C | Tray | | 61.50 | 20.25 | 0.40 | 20.25 | 1.14 | 63.08 | 20.25 | 0.12 | 20.25 | 0.33 |
| 10 | D | Tray | | 57.11 | 14.10 | −2.97 | 14.41 | 348.11 | 58.43 | 14.45 | −3.21 | 14.80 | 347.46 |
| 11 | E | Tray | | 44.01 | 19.99 | −6.67 | 21.07 | 341.54 | 45.39 | 19.54 | −6.57 | 20.61 | 341.42 |
| 12 | F | Tray | | 43.26 | 12.30 | −9.08 | 15.29 | 323.56 | 46.18 | 12.25 | −8.97 | 15.18 | 323.77 |
| 13 | G | Tray | | 48.78 | 18.39 | −6.13 | 19.39 | 341.58 | 50.42 | 18.30 | −6.18 | 19.32 | 341.33 |
| 14 | I | Tray | 3.99 | 44.17 | 15.29 | −4.17 | 15.85 | 344.74 | 43.45 | 16.08 | −4.88 | 16.80 | 343.10 |

| Comparative Example | China On-Glaze Colour Coordinates of Washed Material | | | | | % Ag After Washing |
|---|---|---|---|---|---|---|
| | L | a | b | C | H | |
| 2 | | | | | | ca 0.05 |
| 3 | 81.29 | 6.57 | 1.84 | 6.82 | 15.62 | 0.18 |
| 4 | | | | | | 0.06 |
| 5 | | | | | | ca 0.05 |
| 6 | 80.92 | 6.72 | 2.11 | 7.04 | 17.41 | ca 0.05 |
| 7 | | | | | | ca 0.05 |
| 8 | | | | | | 0.32 |
| 9 | 82.86 | 6.41 | 4.19 | 7.66 | 33.13 | 0.30 |
| 10 | | | | | | 0.19 |
| 11 | | | | | | 0.29 |
| 12 | 75.41 | 8.45 | −1.44 | 8.57 | 350.30 | 0.18 |
| 13 | 77.40 | 10.83 | 1.21 | 10.90 | 6.38 | 0.17 |
| 14 | 76.65 | 9.83 | 1.67 | 9.97 | 9.64 | 0.15 |

It can be seen from the Comparative Examples that poor, paler, powder and on-glaze colours were obtained using the fluoride route, as illustrated by the high L and low C colour coordinates found. The poor colours are due to the low % Ag contained in the lattice. It can also be seen that in spite of what the US specification states, Comparative Examples show that the bulk of the Ag is in free, uncombined, form, which subsequently could be removed by acid washing, leaving only a small proportion within the lattice.

Comparative Example 15

This Comparative Example illustrates how the present process makes better use of the valuable silver starting material than does the process of U.S. Pat. No. 3,046,151. This is demonstrated by comparing the percent Ag in the starting materials (based on equivalent Ag and equivalent zirconia) with that in the pigmentary material. The % of the former to the latter measures the % of the Ag retained in the lattice. The results using figures from the Examples and Comparative Examples specified, are shown in Table 10, in which wrt=with respect to.

TABLE 10

| Comparative Example | Corresponding Example of US Specification | A % Ag wrt Ag + ZrO$_2$ before firing | B % Ag wrt Ag + ZrO$_2$ after firing and acid washing | C % Ag retained in the ZrO$_2$ lattice wrt initial unfired % Ag, ie (B/A) × 100% |
|---|---|---|---|---|
| 4 | 1 | 2.26 | 0.06 | 2.65 |
| 5 | 2 | 2.26 | −0.05 | 2.21 |
| 6 | 3 | 0.63 | −0.05 | 7.94 |
| 3 | 4 | 1.96 | 0.18 | 9.18 |
| 7 | A | 2.48 | −0.05 | 2.02 |
| 8 | B | 2.48 | 0.32 | 12.90 |
| 9 | C | 2.48 | 0.30 | 12.10 |
| 10 | D | 2.48 | 0.19 | 7.66 |
| 11 | E | 2.48 | 0.29 | 11.69 |
| 12 | F | 1.96 | 0.18 | 9.18 |
| 13 | G | 1.54 | 0.17 | 11.04 |
| 14 | I | 7.08 | 0.15 | 2.12 |
| Example | | | | |
| 38 | | 0.99 | 0.63 | 63.64 |
| 39 | | 3.85 | 1.32 | 34.29 |
| 1 | | 8.26 | 2.02 | 24.46 |
| 40 | | 9.09 | 2.22 | 24.42 |

Comparative Example 16

This Comparative Example illustrates how the present material makes better use—in terms of a darker colour (lower CIElab lightness value)—of the Ag retained in the lattice than does the material of U.S. Pat. No. 3,046,151. This is demonstrated by calculating and comparing

|L|

|Ag| values, where |L| is the CIElab lightness (L) value and |Ag| is the percent by weight Ag in the pigmentary material. The results using figures from the Examples specified, are shown in the following Table 11.

TABLE 11

| | Example | Corresponding Example of US Specification | |L| |Ag| After Acid Washing |
|---|---|---|---|
| Comparative Example | 2 | 4 | 1776 |
| | 3 | 4 | 302 |
| | 4 | 1 | 1041 |
| | 5 | 2 | 1296 |
| | 6 | 3 | 1148 |
| | 7 | A | 1093 |
| | 8 | B | 146 |
| | 9 | C | 210 |
| | 10 | D | 307 |
| | 11 | E | 157 |
| | 12 | F | 256 |
| | 13 | G | 296 |
| | 14 | I | 290 |
| Example | 1 | — | 13.38 |
| | 2 | — | 32.10 |
| | 3 | — | 29.52 |
| | 4 | — | 20.03 |
| | 5A | — | 37.74 |
| | 5B | — | 38.33 |
| | 5C | — | 34.25 |
| | 5D | — | 27.42 |
| | 5E | — | 15.34 |
| | 5F | — | 34.34 |
| | 5G | — | 31.01 |
| | 5H | — | 30.92 |
| | 6A | — | 15.18 |
| | 6B | — | 14.93 |
| | 8 | — | 43.68 |
| | 9 | — | 41.66 |
| | 10 | — | 155.80 |
| | 11 | — | 71.15 |
| | 12 | — | 27.61 |
| | 13 | — | 17.20 |
| | 13B | — | 21.41 |
| | 13C | — | 16.37 |
| | 14 | — | 24.52 |
| | 15 | — | 22.35 |
| | 16 | — | 12.25 |
| | 17 | — | 13.81 |
| | 18 | — | 76.56 |
| | 19 | — | 43.0 |
| | 20 | — | 28.01 |
| | 21 | — | 72.78 |
| | 22A | — | 22.19 |
| | 22B | — | 21.46 |
| | 22C | — | 17.04 |
| | 23 | — | 24.76 |
| | 24 | — | 31.21 |
| | 25 | — | 25.14 |
| | 26 | — | 27.33 |
| | 27 | — | 46.08 |
| | 28 | — | 19.99 |
| | 29 | — | 91.67 |
| | 30 | — | 41.23 |
| | 31 | — | 29.36 |
| | 32 | — | 57.58 |
| | 38 | — | 142.40 |
| | 39 | — | 28.36 |
| | 40 | — | 12.77 |
| | 41 | — | 24.75 |
| | 42 | — | 87.33 |
| | 43 | — | 150.19 |
| | 44 | — | 14.83 |
| | 45 | — | 12.32 |
| | 46 | — | 188.55 |
| | 47 | — | 167.44 |
| | 48 | — | 15.79 |
| | 49 | — | 23.06 |
| | 50 | — | 71.05 |
| | 51 | — | 112.49 |
| | 52 | — | 14.95 |
| | 53 | — | 13.92 |
| | 54 | — | 12.68 |
| | 55 | — | 12.83 |

TABLE 11-continued

|  | Example | Corresponding Example of US Specification | \|L\| \|Ag\| After Acid Washing |
|---|---|---|---|
|  | 56 | — | 38.78 |
|  | 57A | — | 51.89 |
|  | 57B | — | 30.62 |
|  | 58A | — | 27.89 |
|  | 58B | — | 32.21 |
|  | 59A | — | 23.06 |
|  | 59B | — | 26.85 |
|  | 60 | — | 29.10 |
|  | 61 | — | 13.31 |
|  | 62 | — | 4.73 |
|  | 83 | — | 57.60 |
|  | 84 | — | 59.96 |
| Comparative Example | 1 | — | 588.75 |

We claim:

1. A pink or purple pigmentary material consisting essentially of silver in a lattice of crystalline zirconia, which material contains at least 0.4% by weight of the silver, wherein the material in the absence of gold is pink or purple.

2. A material according to claim 1 which contains in its surface less than 0.1 atomic % of fluoride as measured by X-ray photoelectron spectroscopy.

3. A material according to claim 1 which contains 1–6% by weight of the silver in the lattice.

4. A process for preparing the material claimed in claim 1, which process comprises calcining a zirconium component which yields the zirconia, and a silver component which yields the silver, forming a mixture at calcination temperature of the zirconium and silver moieties and cooling the mixture.

5. A process according to claim 4 which comprises calcining a mixture of the zirconium component and the silver component to form the calcination mixture.

6. A process according to claim 4 wherein the calcination mixture is at a temperature in the range 650°–1100° C.

7. A process according to claim 4 wherein the zirconium component is such that it decomposes to zirconia on heating to the temperature of the calcination mixture.

8. A process according to claim 4 wherein the zirconium component is zirconyl hydroxide and/or zirconium carbonate.

9. A process according to claim 4 wherein the zirconium component is amorphous.

10. A process according to claim 4 wherein the zirconium component is of particle size 1–15 μm as measured by Coulter Counter.

11. A process according to claim 4 wherein the silver component is metallic silver or is such that it at least has begun to decompose to metallic silver on heating to a temperature below 600° C.

12. A process according to claim 4 wherein the silver component is metallic silver or is such that it at least has begun to decompose to metallic silver at a temperature not more than 200° C. above the temperature at which the zirconium component begins to form crystalline zirconia.

13. A process according to claim 4 wherein the silver component is silver, silver nitrate, silver acetate, silver(I) oxide or silver carbonate.

14. A process according to claim 4 wherein the silver component is of particle size 0.1–15 μm as measured by Coulter Counter.

15. A process according to claim 4 wherein at least 15% of the Ag in the combined weight of the zirconium component, calculated as zirconia, and the silver component, calculated as silver, is retained as the Ag in the pigmentary material.

16. A pigment comprising the pigmentary material of claim 1 admixed with other pigmentary material.

17. The pigment of claim 16, wherein the other pigmentary material comprises colloidal gold.

18. A substance colored by containing dispersed therein the pigmentary material of claim 1.

19. An enamel composition comprising a frit in combination with the pigmentary material of claim 1.

20. A transfer comprising an enamel composition on a transfer backing sheet, wherein the enamel composition comprises a frit in combination with the pigmentary material of claim 1.

21. An article bearing on its surface an enamel composition which has been fired thereon, wherein the enamel composition comprises a frit in combination with the pigmentary material of claim 1.

22. An article according to claim 21 which comprises porcelain, china, earthenware or glass.

23. The pigmentary material according to claim 1, wherein the material contains less than 0.1 weight percent fluoride.

24. A process for preparing a pigmentary material comprising silver in a lattice of crystalline zirconia, which process comprises calcining a zirconium component which yields the zirconia, and a silver component which yields the silver, forming a mixture at calcination temperature of the zirconium and silver moieties and cooling the mixture, wherein in said process there is an absence of added fluoride in the calcination mixture.

25. A process for preparing a pigmentary material comprising silver in a lattice of crystalline zirconia, which process comprises calcining a mixture of a zirconium component which yields the zirconia, and a silver component which yields the silver, and cooling the mixture, wherein in said process there is an absence of added fluoride in the mixture.

* * * * *